(12) United States Patent
Duschatko et al.

(10) Patent No.: US 6,934,305 B1
(45) Date of Patent: Aug. 23, 2005

(54) METHOD AND APPARATUS FOR DETECTING ERRORS IN A BACKPLANE FRAME

(75) Inventors: Douglas E. Duschatko, McKinney, TX (US); Lane Byron Quibodeaux, Allen, TX (US); Robert A. Hall, Richardson, TX (US); Andrew J. Thurston, Allen, TX (US)

(73) Assignee: Cisco Technology, Inc., San Jose, CA (US)

( * ) Notice: Subject to any disclaimer, the term of this patent is extended or adjusted under 35 U.S.C. 154(b) by 592 days.

(21) Appl. No.: 09/629,474

(22) Filed: Jul. 31, 2000

Related U.S. Application Data

(63) Continuation-in-part of application No. 09/477,166, filed on Jan. 4, 2000, which is a continuation-in-part of application No. 09/232,395, filed on Jan. 15, 1999, now Pat. No. 6,724,757.
(60) Provisional application No. 60/211,851, filed on Jun. 15, 2000.

(51) Int. Cl.[7] .................................................. H04J 3/06
(52) U.S. Cl. ....................................... 370/514; 370/503
(58) Field of Search ................................. 370/503, 506, 370/508, 509, 510, 511, 512, 513, 514

(56) References Cited

U.S. PATENT DOCUMENTS

| | | | |
|---|---|---|---|
| 4,074,072 A | 2/1978 | Christensen et al. ........... | 179/15 |
| 4,470,139 A | 9/1984 | Munter ......................... | 370/66 |
| 4,683,564 A | 7/1987 | Young et al. .................. | 370/63 |
| 4,939,721 A | 7/1990 | De Bosio ...................... | 370/60 |
| 5,023,864 A | 6/1991 | Cloonan et al. ................ | 370/1 |
| 5,168,492 A | 12/1992 | Beshai et al. ................ | 370/60.1 |
| 5,200,746 A | 4/1993 | Yoshifuji .................. | 340/825.8 |
| 5,307,342 A | 4/1994 | Georgiou et al. ........... | 370/380 |
| 5,410,600 A | 4/1995 | Toy ............................... | 380/9 |
| 5,524,154 A | 6/1996 | Bergland et al. ............... | 385/17 |
| 5,657,449 A | 8/1997 | Osaki ......................... | 370/357 |
| 5,666,218 A | 9/1997 | Hill ............................. | 359/139 |
| 5,754,320 A | 5/1998 | Watanabe et al. ............ | 359/117 |
| 5,771,320 A | 6/1998 | Stone .......................... | 385/16 |
| 5,777,761 A | 7/1998 | Fee ............................. | 359/110 |
| 5,784,505 A | 7/1998 | Schunk ......................... | 385/17 |
| 5,835,517 A | 11/1998 | Jayaraman et al. ........... | 372/50 |
| 5,884,017 A | 3/1999 | Fee ............................. | 370/217 |
| 6,026,095 A | 2/2000 | Sherer et al. ............... | 370/401 |
| 6,101,010 A | 8/2000 | Konishi ....................... | 359/110 |
| 6,111,673 A | 8/2000 | Chang et al. ................ | 370/392 |
| 6,151,304 A | 11/2000 | Doshi et al. ................ | 370/238 |
| 6,160,813 A | 12/2000 | Banks et al. ................ | 370/422 |
| 6,188,686 B1 | 2/2001 | Smith ......................... | 370/388 |
| 6,262,820 B1 | 7/2001 | Al-Salameh ................ | 359/119 |
| 6,266,333 B1 | 7/2001 | Kartalopoulos ............. | 370/395 |

FOREIGN PATENT DOCUMENTS

| | | |
|---|---|---|
| DE | W/O 97/35029 | 8/1997 |
| EP | 0 752 795 A2 | 1/1997 |
| EP | 0 802 697 A2 | 10/1997 |
| WO | WO 97/04397 | 2/1997 |
| WO | WO 97/24901 | 7/1997 |

OTHER PUBLICATIONS

H. Michael Zadikian, Ali Saleh; John C. Adler, Zareh Baghdasarian, Vahid Parsi, "A Resource Management Protocol For A Configurable Network Router", filed Jan. 4, 2000; U.S. Appl. No. 60/174,323.

(Continued)

*Primary Examiner*—Duc Ho
*Assistant Examiner*—Thien Tran
(74) *Attorney, Agent, or Firm*—Campbell Stephenson Ascolese LLP; Samuel G. Campbell, III

(57) ABSTRACT

A method of generating a parity value is disclosed. The method includes reading a word from a data stream, determining if the word should be included in a parity calculation, and including the word in the parity calculation, if the word should be included in the parity calculation, and ignoring the word otherwise.

81 Claims, 15 Drawing Sheets

OTHER PUBLICATIONS

Ali Saleh, H. Michael Zadikian; John C. Adler, Zareh Baghdasarian, Vahid Parsi, "Configurable Network Router", filed Jan. 15, 1999; U.S. Appl. No. 09/232,395.

Ali N. Saleh, Douglas E. Duschatko, Lane Byron Quibodeaux, "Method And Apparatus For A Rearrangeably Non–Blocking Switching Matrix", filed Jan. 4, 2000; U.S. Appl. No. 09/477,166.

H. Michael Zadikian, Ali Saleh, John C. Adler, Zareh Baghdasarian, Vahid Parsi, "A Method of Allocating Bandwidth in an Optical Network" (as amended), filed Jan. 15, 1999, U.S. Appl. No. 09/232,396.

Ronald Alan Russell and Michael Kevin Anthony, "A Method And Apparatus For Isolating Faults In A Switching Matrix", filed Jan. 4, 2000; U.S. Appl. No. 09/477,217.

Ali Saleh; H. Michael Zadikian; Zareh Baghdasarian, Vahid Parsi, "A Method For Routing Information Over A Network", filed Jan. 15, 1999; U.S. Appl. No. 09/232,397.

H. Michael Zadikian; Steven E. Plote, John C. Adler, David Parish Autry, Ali Saleh, "Method of Providing Network Services", filed Jan. 4, 2000; U.S. Appl. No. 09/477,498.

Ali Saleh, "A Method For Path Selection In A Network", filed Jan. 4, 2000; U.S. Appl. No. 09/478,235.

Ali N. Saleh and Stevan E. Plote, "A Network Addressing Scheme For Reducing Protocol Overhead In An Optical Network", filed Sep. 2, 1999, U.S. Appl. No. 09/389,302.

Ali N. Saleh, Douglas E. Duschatko, Lane Byron Quibodeaux, "Method And Apparatus For A Rearrangeably Non–Blocking Switching Matrix", filed Jan. 4, 2000; U.S. Appl. No. 09/477,166.

Michael H. Zadikian, Ali Saleh; John C. Adler, Zareh Baghdasarian, Vahid Parsi, "Configurable Network Router", filed Jan. 15, 1999; U.S. Appl. No. 09/232,396.

Komine, et al., "A Distributed Restoration Algorithm for Multiple–Link and Node Failures of Transport Networks," *IEEE, Globecom '90,* Apr. 1990.

Zhang, et al., "On Fundamental Issues in IP Over WDM Multicast," *IEEE, Computer Communications and Networks,* Sep. 1999.

METHOD AND APPARATUS FOR DETECTING ERRORS IN A BACKPLANE FRAME

CROSS-REFERENCES TO RELATED APPLICATIONS

This application is a continuation-in-part of patent application Ser. No. 09/477,166, filed Jan. 4, 2000, and entitled "METHOD AND APPARATUS FOR A REARRANGEABLY NON-BLOCKING SWITCHING MATRIX," having A. N. Saleh, D. E. Duschatko and L. B. Quibodeaux as inventors which is a continuation-in-part of patent application Ser. No. 09/232,395, filed Jan. 15, 1999, now U.S. Pat. No. 6,724,757, and entitled "A CONFIGURABLE NETWORK ROUTER," having H. M. Zadikian, A. N. Saleh, J. C. Adler, Z. Baghdasarian, and V. Parsi as inventors. These applications are assigned to Cisco Technology, Inc., the assignee of the present invention, and are hereby incorporated by reference, in their entirety and for all purposes.

This application also claims priority from Provisional Patent Application Ser. No. 60/211,851, filed Jun. 15, 2000, and entitled "METHOD AND APPARATUS FOR DETECTING ERRORS IN A BACKPLANE FRAME," having D. E. Duschatko, L. B. Quibodeaux, R. A. Hall and A. J. Thurston as inventors. This application is assigned to Cisco Technology, Inc., the assignee of the present invention, and is hereby incorporated by reference, in its entirety and for all purposes.

BACKGROUND OF THE INVENTION

1. Field of the Invention

This invention relates to the field of information networks, and more particularly relates to detecting errors in network elements that route information through such information networks.

2. Description of the Related Art

Today's networks carry vast amounts of information. High bandwidth applications supported by these networks include streaming video, streaming audio, and large aggregations of voice traffic. In the future, these bandwidth demands are certain to increase. This information must be quickly and efficiently distributed to various destinations without the introduction of errors. Many modern networking topologies employ a switching matrix of some kind to perform this function.

For example, certain networks employ a point-to-point topology in which each node is coupled to another node by one or more connections. The easiest way to interconnect a group of N nodes is by using an N×N crossbar switch. One advantage is that such a scheme is strictly non-blocking. This means that a connection can be made between any unused input and any unused output, regardless of the current state of the switch. Thus, the switch can be reconfigured at any time without introducing errors in the pre-existing information streams (i.e., connections). This is an important capability in many applications, such as data networks (e.g., errors causing retransmission of the damaged data and so reducing available bandwidth) and telephony networks (e.g., dropped telephone calls). However, N×N crossbar switches grow exponentially as connections are added, meaning that $N^2$ switches are required to build a network having N inputs and N outputs. Alternatively, such connections can be configured using one of a number of multi-stage interconnection network (MIN) architectures. MIN architectures can generally be divided into three classes: blocking, rearrangeably non-blocking, and strictly non-blocking.

A blocking network is characterized by the property that there is only one path from any input to any output. Because some of the paths share one or more links within the MIN, a high number of permutations cannot be routed when using such networks. A rearrangeably non-blocking network allows idle pairs of input and output ports to be connected after possibly rearranging some of the existing connections (i.e., reconfiguring the switching matrix), although information carried on some or all of the existing connections may experience errors during the switching matrix's reconfiguration. A strictly non-blocking network allows any idle pair of input and output ports to be connected without having to rearrange any of the existing connections without errors being experienced on the existing connections, regardless of the current state of the network.

However, as in any information system, errors can occur in the data streams switched by the switching matrix employed. Left undetected, such errors can cause signal degradation and interruptions. This is of particular importance in real-time applications such as telephony and streaming video, where such signal degradation and interruptions are especially noticeable to the users of such systems. Thus, such errors should be detected quickly and accurately to maintain the quality of such signals.

SUMMARY OF THE INVENTION

According to one embodiment of the present invention, a method of generating a parity value is disclosed. The method includes reading a word from a data stream, determining if the word should be included in a parity calculation, and including the word in the parity calculation, if the word should be included in the parity calculation, and ignoring the word otherwise.

According to another embodiment of the present invention, a method of generating a backplane parity value is disclosed. The method includes receiving a data stream at a communications interface of a telecommunications system and rearranging the data stream. The data stream includes a first number of words, and the data stream is rearranged into a second number of words. The second number of words include a relock word, which is configured to allow the telecommunications system to synchronize with the data stream. For each of the second number of words, a determination is made as to whether each of the second number of words should be included in a parity calculation. This is accomplished by determining whether the given one of those words is the relock word, and either including the given word or ignoring it. If the given one of the second number of words is the relock word, that word is ignored. Otherwise, that word is included in the parity calculations performed.

According to still another embodiment of the present invention, a method of transmitting information across a switching matrix is disclosed. The method includes receiving information, rearranging a number of the words into a second format and generating a parity value from at least one of the words. The information is organized in a transmission unit, which is divided into a number of words that are arranged in a first format.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates identical items unless otherwise indicated.

DETAILED DESCRIPTION OF THE INVENTION

Figure 1A:
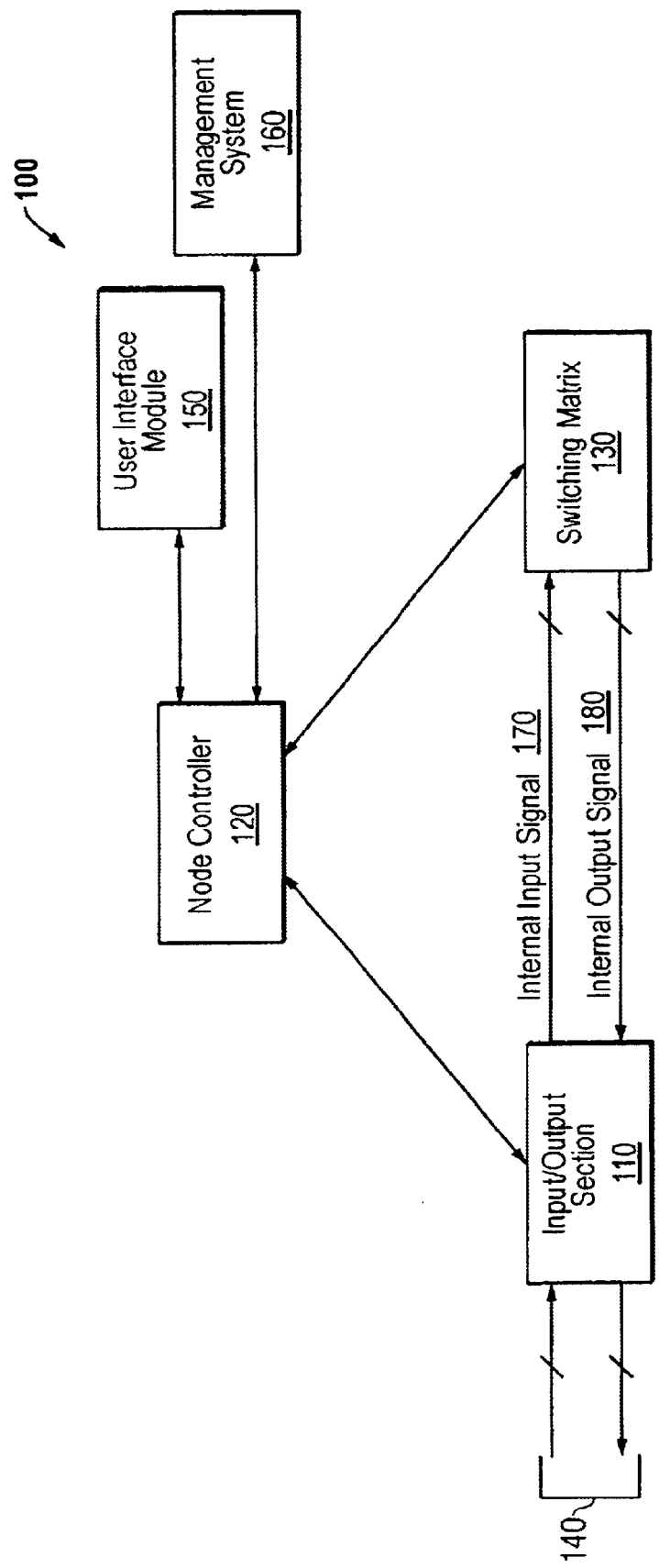
FIG. 1A is a block diagram of an exemplary router.

The following is intended to provide a detailed description of an example of the invention and should not be taken to be limiting of the invention itself. Rather, any number of variations may fall within the scope of the invention which is defined in the claims following the description.

In addition, the following detailed description has been divided into sections, subsections, and so on, in order to highlight the various subsystems of the invention described herein; however, those skilled in the art will appreciate that such sections are merely for illustrative focus, and that the invention herein disclosed typically draws its support from multiple sections. Consequently, it is to be understood that the division of the detailed description into separate sections is merely done as an aid to understanding and is in no way intended to be limiting.

Introduction

By controlling the point in time at which switching occurs and re-arranging the incoming data (which is organized into transmission units such as frames or packets), a switching matrix employing such techniques can be designed to be relatively simple and inexpensive, while avoiding interruption of existing connections during matrix reconfiguration. However, due to factors such as the data stream's data rate, system noise, switching errors and the like, errors may be introduced into the data stream during the data stream's traversal of the switching matrix. A method and apparatus according to one embodiment of the present invention detects such errors, while avoiding false errors that can be created during the switching of such a switching matrix.

To avoid disruption of existing data streams, a switching matrix employing the foregoing techniques is switched at a point in the data stream in which no live data is being transmitted. Using such a method, switching can be performed without disturbing the connections already configured in the switching matrix. A switching matrix operated in this manner is therefore referred to herein as being non-blocking. The incoming data can be rearranged to provide a larger window of time during which the switching matrix can be switched. A non-blocking switching matrix according to the present invention using such a technique is referred to herein as a rearrangeably non-blocking switching matrix. In the case of a switch using an optical backplane (e.g., the drivers, cabling (optical and/or electrical), switching components and the like), this also allows more time for various components of the system to re-acquire phase lock (e.g., clock/data recovery units situated along the signal path).

This switching and relocking can be thought of in terms of a wavefront traveling through the signal path of router such as that described herein. The point at which switching and relocking may occur within the data stream is actually a given number of bit times. This "window" in the data stream travels through the router, with live data to either side, and is sequentially encountered by each element along the signal path through the router. During the time between when the beginning of the window and the end of the window is encountered by a given element, the element may switch, relock, or otherwise experience a disruption in the data stream without the disruption of the live data being carried.

To support this technique, the input/output connections to and from the matrix are preferably maintained during a matrix rearrangement, with only paths internal to the router's switching matrix being altered. To improve signal fidelity, the switching matrix incorporates several clock/data recovery units (CDRs) in the signal path from matrix input to matrix output. These CDRs are configured in a serial sequence through the matrix. As the window travels through the router (i.e., the serial data signal is disrupted (e.g., due to a switch change)), the CDRs reacquire lock one at a time, in a serial fashion.

An Exemplary Network Element

FIG. 1A illustrates a router 100. Router 100 includes an input/output section 110, a node controller 120, and a switching matrix 130. Node controller 120 contains, for example, real time software and intelligent routing protocols (not shown). Router 100 supports interfaces including, but not limited to, optical signal interfaces (e.g., SONET), a user interface module 150, and a management system 160. Internal input signals 170 and internal output signals 180 may be electrical or optical in nature.

Figure 1B:
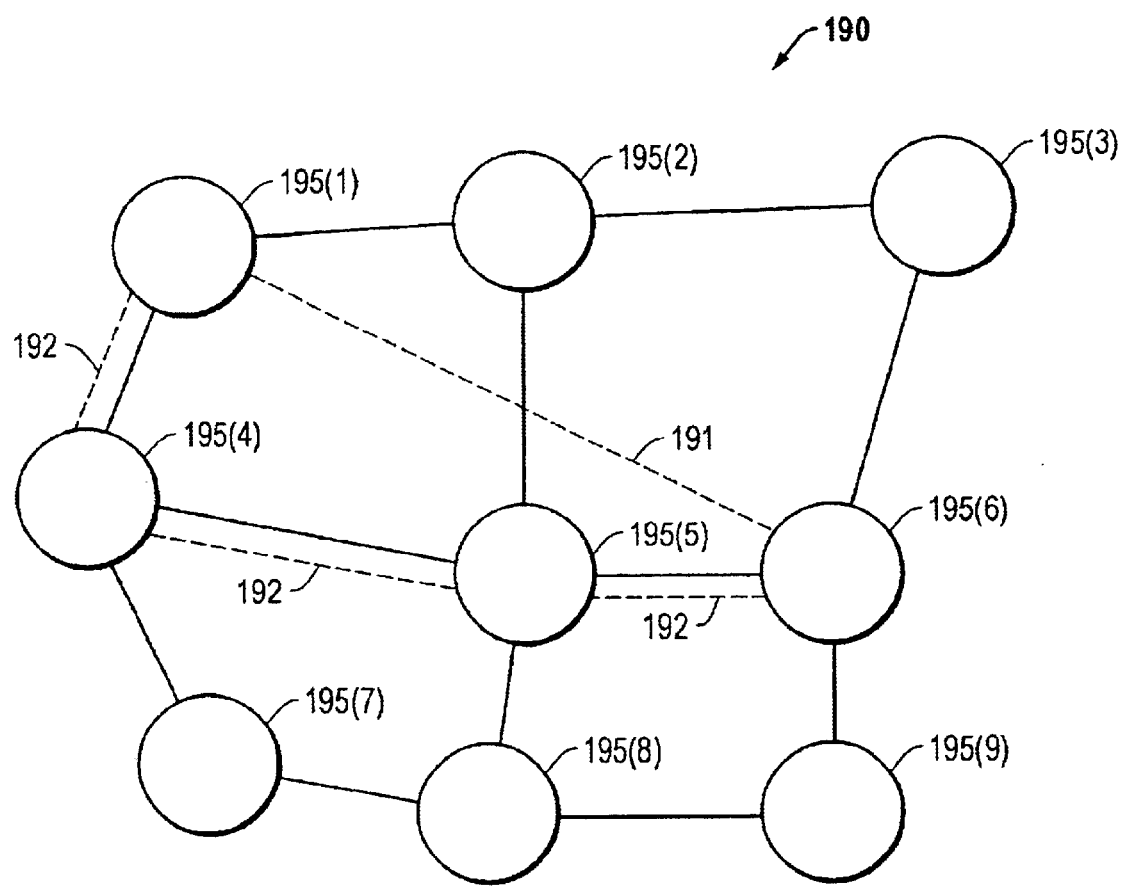
FIG. 1B is a block diagram of a network including a number of the routers of FIG. 1A.

FIG. 1B illustrates a network 190 that includes a number of nodes, network nodes 195(1)–(N). One or more of network nodes 195(1)–(N) can be a router such as router 100. Network 190 can thus support the automatic provisioning, testing, restoration, and termination of virtual paths (exemplified by a virtual path 191) over a physical path (exemplified by a physical path 192) from one of network nodes 195(1)–(N) to another of network nodes 195(1)–(N).

In one embodiment, there are at least three types of processors in a router 100. The lowest level, level-3, resides on the line card and is responsible for all real time aspects of the processing of the physical protocol (e.g., SONET). In a SONET implementation, every level-3 processor is responsible for a single optical signal (e.g., an OC-48 signal) and, via a protocol processor, performs all required SONET/SDH section and line termination functions. The fast response time required from the level-3 processor makes a firmware implementation preferable. The firmware, which may be written in the "C" or "C++" programming languages, assembler, or other programming language, is preferably optimized for low latency and resource efficiency. Higher-level processing is implemented on a separate module, the shelf processor module, which is shared by several line cards.

The second level of processors, level-2, reside on a shelf and main matrix processor modules. The software on the shelf processor module is responsible for managing and controlling line cards. Only half the line cards supported are active at any one time in order to support 1+1 protection. A level-2 processor deals with tasks that require a reasonable response time (for example, on the order of milliseconds), but have no direct impact on the data path. In other words, missed events, such as hardware interrupts, do not result in bit errors. Some of the functions handled by the shelf processor include the periodic collection of maintenance data from the line cards, receiving and processing periodic keep-alive messages from those cards, shelf startup and configuration, proxy management, and other related functions.

The third processor level, level-1, resides on a system processor module and provides system-wide management and control services. In one embodiment, there are preferably two fully synchronous copies of the level-1 processor in the system, both of which are simultaneously active and, through a dedicated and redundant high-speed link, keep their run-time and stored databases fully synchronized. One of the two processors is designated the master and is responsible for all level-1 processing. An update message is sent to the second processor whenever a change is made to the database and before that change is effected. A periodic keep-alive mechanism allows either copy of the system controller to detect failures on the other copy.

Router 100 provides yet another type of processor, referred to herein as a route processor. Such a processor is dedicated to the path/route discovery and restoration functions. The route processor is responsible for receiving failure indications from the line cards, calculating a new route for failed connections, and sending reconfiguration requests to all affected nodes, including its own.

Hardware Architecture

In one embodiment, router 100 can be used, for example, as SONET/SDH line terminating equipment (LTE) capable of terminating the Section and Line overheads of received OC-48 signals, and cross-connects those signals according to provisioned input-output mappings. Some of the terminated signals can optionally be protected using any of the common protection schemes (1+1, 1:1, and 1:N). Overhead processing and generation is performed on the line card by a protocol processor. This protocol processor handles all aspects of the SONET protocol, including framing, insertion and extraction of embedded data channels, error checking, AIS detection, pointer processing, clock recovery, multiplexing/duplexing, and similar duties.

Signal Path

Figure 2:
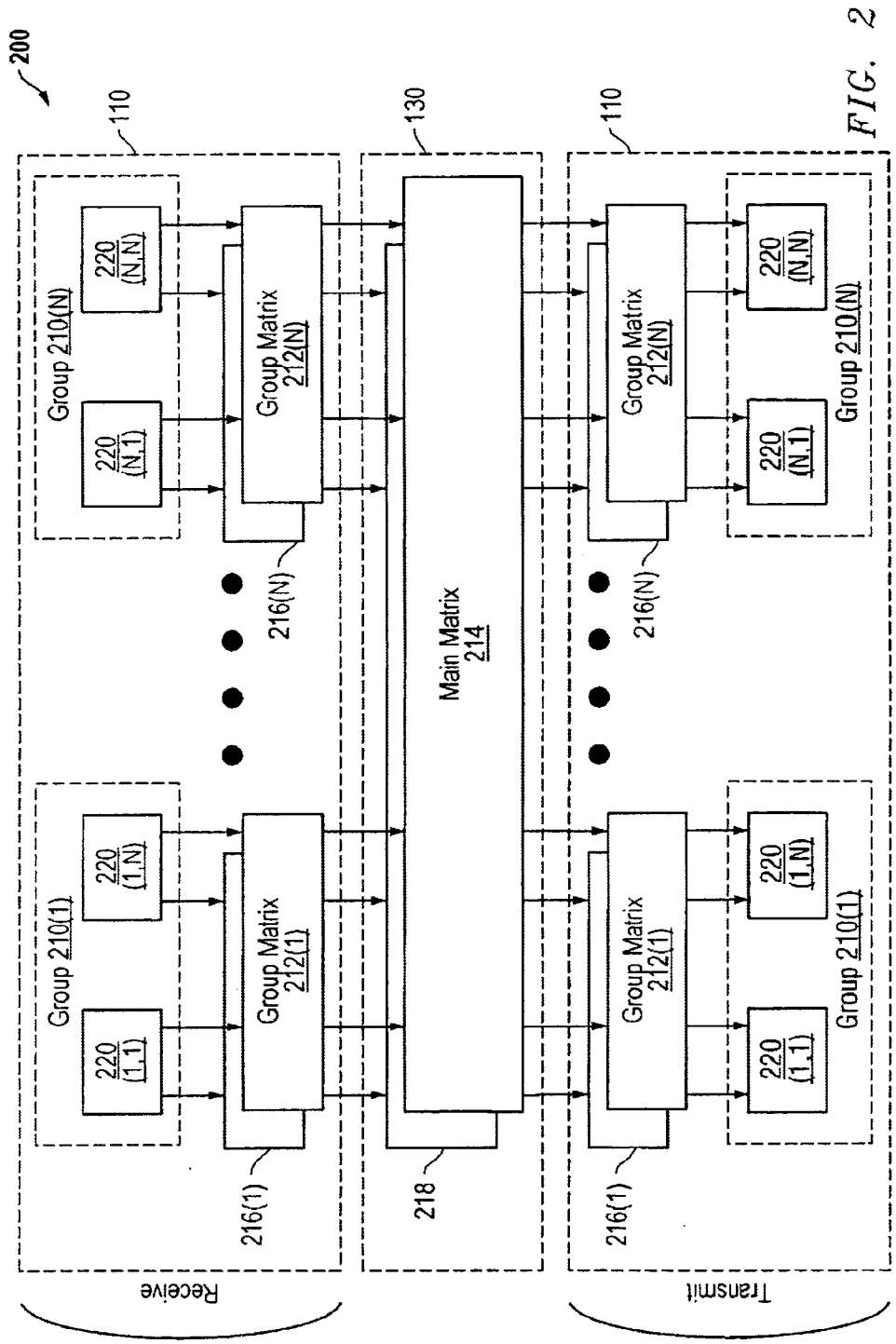
FIG. 2 is a block diagram of the signal paths and functional blocks of the router of FIG. 1A.

FIG. 2 is a block diagram of signal paths 200 within router 100. The primary signal paths in router 100 include one or more groups exemplified by groups 210(1)–(N), group matrices 212(1)–(N), and a main matrix 214. As depicted in FIG. 1A, groups 210(1)–(N), and group matrices 212(1)–(N) are shown as having receive and transmit sections. Groups 210(1)–(N) each include line cards 220(1,1)–(1,N), through line cards 220(N,1)–(N,N). Signals from line cards 220(1, 1)–(N,N) are sent to the corresponding group matrix. In one embodiment, two sets of the group matrix cards, group matrices 212(1)–(N) and 216(1)–(N) are employed. Main matrix 214 is also mirrored in one embodiment by a redundant copy, a backup main matrix 218, which together form switching matrix 130. As shown in FIG. 2, the redundancy for group matrices 212(1)–(N) (i.e., group matrices 216(1) –(N)), is also provided on the transmit side.

It will be noted that the variable identifier "N" is used in several instances in FIG. 2 (and subsequent use of other variables, such as "m," "x," "k," and others) to more simply designate the final element (e.g., group matrix 212(N), line card 220(N,N), and so on) of a series of related or similar elements (e.g., group matrices 212(1)–(N), line cards 220 (1,1)–(N,N), and so on). The repeated use of such variable identifiers is not meant to imply a correlation between the sizes of such series of elements. The use of such variable identifiers does not require that each series of elements has the same number of elements as another series delimited by the same variable identifier. Rather, in each instance of use, the variable identified by "N" (or "m," "x," "k," and others) may hold the same or a different value than other instances of the same variable identifier. For example, group matrix 212(N) may be the tenth group matrix in a series of group matrices, whereas line card 220(N,N) may be the forty-eighth line card in a series of line cards.

Using signal paths 200 as an example, data enters the system at one of line cards 220(1,1)–(N,N). It is at this point, in a SONET-based system, that the Section and Line overheads are processed and stripped off by a protocol processor (not shown). The extracted SONET/SDH payload envelope is then synchronized with the system clock and sent to two different copies of a local matrix, depicted as group matrices 212(1)–(N) and 216(1)–(N) in FIG. 1A. In one embodiment, group matrices 212(1)–(N) and 216(1)–(N) are used mainly as 2:1 reduction stages that select one of two optical signals and pass the selected optical signal to switching matrix 130. This allows the implementation of a variety of protection schemes (including 1:N, or 0:1) without having to use any additional ports on main matrix 214. All protect signals are terminated at group matrices 212(1)–(N) and 216(1)–(N). In order to maximize bandwidth, it is preferable that only active signals be passed through to switching matrix 130.

In one embodiment, switching matrix 130 is an errorless, rearrangeably non-blocking switching network. In one embodiment, switching matrix 130 is a 256×256 switching network that consists of three columns and 16 rows of 16×16 switching elements that allow any of their inputs to be connected to any of their outputs. A single copy of the matrix may be housed, for example, in a single rack that contains three shelves, one for each column (or stage) of the matrix. Each one of such shelves contains cards housing the 16 switching elements in each stage. The switching element itself includes, for example, a 16×16 crosspoint switch, with optical transceivers, and a microcontroller for controlling the crosspoint switch and providing operational feedback to the level-2 processor. Communications between the two processors may be carried, for example, over an Ethernet connection. The level-2 processor in turn communicates with the level-1 and route processors.

The switching elements in each matrix copy of the exemplary embodiment may be connected using fiber-optic cables, for example. While copper cabling may also be employed, such an option may not offer the speed and number of connections provided by an optical arrangement. After passing through the stages of switching matrix 130, an optical signal may be routed to an I/O shelf that (optionally) splits the optical signal into two signals. One of the signals is sent to an active line card, while the other, when available, is sent to a backup card.

Line cards 220(1,1)–(N,N) receive optical signals from group matrices 212(1)–(N) and 216(1)–(N) which are in turn connected to two separate copies of the main matrix. Line cards 220(1,1)–(N,N) monitor both signals for errors and, after a user-defined integration period, switch to the backup signal if that signal exhibits better bit error rate (BER) performance than the prior active signal. This scheme, referred to herein as 1-plus-1, allows line cards 220(1,1)–(N,N) to select between the two copies of the group matrix without any level-1 or level-2 CPU intervention. This helps to ensure that such a switch can be made in 50 ms or less (per Bellcore's recommendations in GR-253 (GR-253: *Synchronous Optical Network (SONET) Transport Systems*, Common Generic Criteria, Issue 2 [Bellcore, December 1995], included herein by reference, in its entirety and for all purposes)). The selected signal is then processed by the transmit section of the protocol processor, which inserts all required transport overhead bytes into the outgoing stream.

Regarding the signals described herein, both above and subsequently, those skilled in the art will recognize that a signal may be directly transmitted from a first logic block to a second logic block, or a signal may be modified (e.g., amplified, attenuated, delayed, latched, buffered, inverted, filtered or otherwise converted, etc.) between the logic blocks. Although the signals of the embodiments described herein are characterized as transmitted from one block to the next, other embodiments may include modified signals in place of such directly transmitted signals with the informational and/or functional aspect of the signal being transmitted between blocks. To some extent, a signal input at a second logic block may be conceptualized as a second signal derived from a first signal output from a first logic block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not substantively change the informational and/or final functional aspect of the first signal.

Control Path

Figure 3:
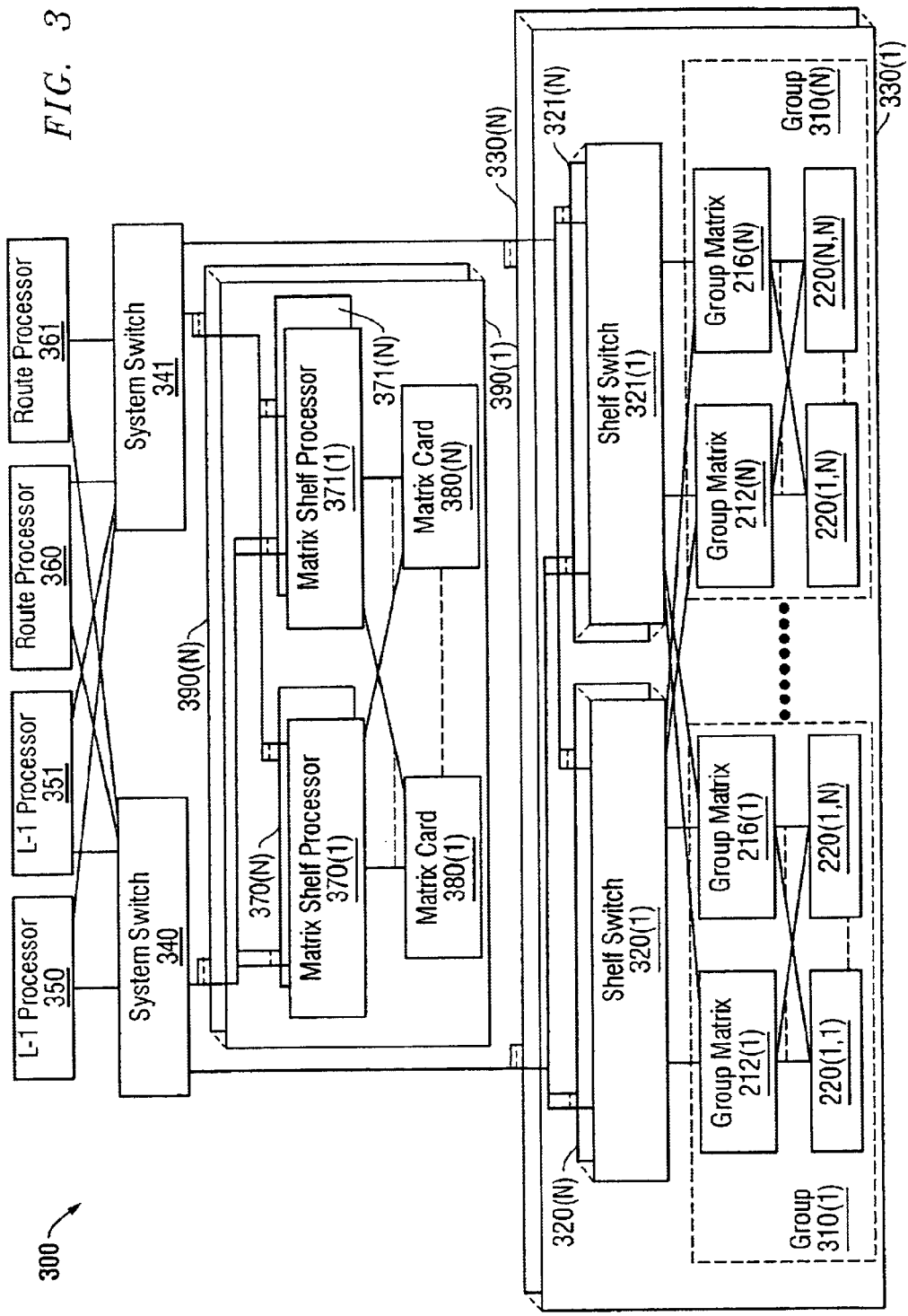
FIG. 3 is a block diagram of the control paths of the router of FIG. 1A.

FIG. 3 illustrates a control path 300 of a router, such as router 100. Control path 300 includes all non-payload-related flows within the system and the hardware and software necessary to the control of the signal paths illustrated in FIG. 2. All major control flows are carried over an internal local area network (LAN), which is, for example, a collection of switched Ethernet segments. The structure of the internal LAN is hierarchical and can be created using a mixture of 10 Mbps and 100 Mbps Ethernet segments, for example. Higher-speed segments (e.g., gigabit Ethernet) can be used as well.

Groups

At the bottom of the hierarchy is what is referred to herein as a group matrix, or a Group Ethernet Repeater in a system using Ethernet communications, and depicted in FIG. 3 as group matrices 212(1)–(N) and 216(1)–(N). Each one of group matrices 212(1)–(N) and 216(1)–(N), also referred to herein as a hub, a repeater, or a concentrator, is a physical layer device and preferably supports a star network topology, such as the IEEE 802.3 10BASE-T networking standard. The redundant connections from line cards 220(1,1)–(N,N) in each of groups 310(1)–(N) are connected to two repeaters that reside on two separate copies of the group matrix module. Preferably, each one of line cards 220(1,1)–(N,N) supports two network ports (e.g., 10BASE-T Ethernet ports). The two sets of four signals from each port pass through a relay that selects one of them for connection to the LAN for purposes of redundancy. Groups 310(1)–(N) represent the first layer of the control bus hierarchy. Group matrices 212(1)–(N) and 216(1)–(N) are each controlled by a shelf processor (not shown, for the sake of clarity) and communicate with one of the shelf switches described below via LAN connections.

Shelf Ethernet Switch

FIG. 3 also illustrates certain features of router 100 pertaining to the relationship between shelf switches 320(1)–(N) and 321(1)–(N), and groups 310(1)–(N). Groups 310(1)–(N) are again shown, with regard to the control functions thereof. In this depiction of groups 310(1)–(N), line cards 220(1,1)–(N,N) are shown as being attached to networking devices, indicated here as group matrices. Group matrices 212(1)–(N) and 216(1)–(N) may be, for example, multi-port Ethernet hubs running at 10 Mbps. Each of line cards 220(1,1)–(N,N) feed signals into two of group matrices 212(1)–(N) and 216(1)–(N). For example, line card 220(1,1) feeds received information to group matrices 212(1) and 216(1). Group matrices 212(1)–(N) and 216(1)–(N) each feed a signal into shelf switches 320(1)–(N) and 321(1)–(N) of FIG. 2. Shelf switches 320(1)–(N) and 321(1)–(N) are each controlled by a shelf processor (not shown for the sake of clarity) and communicate with one of the system switches (not shown, for the sake of clarity).

Shelf switches 320(1)–(N) and 321(1)–(N) are the next higher level of the control hierarchy in router 100, and are located on the shelf processor module (exemplified by line racks (330(1)–(N)). Each copy of shelf switches 320(1)–(N) and 321(1)–(N) interconnects six connections from the three groups in each shelf, another connection from the shelf processor, and one connection from system switch 340 (and 341). Shelf switches 320(1)–(N) and 321(1)–(N) can be implemented, for example, using an 8-port Ethernet configured to handle 10 Mbps Ethernet traffic and a single-port, dual-rate switch (e.g., 10 Mbps/100 Mbps Ethernet).

System Switch

The next level of the hierarchy is the system switch, of which there are two copies in each router. These are shown as system switches 340 and 341 in FIG. 3. This fully redundant scheme prevents failures on one switch from taking down the entire control bus. In one embodiment, a system switch manages connections from the following sources:

1. High-speed connection(s) from shelf switches 320(1)–(N) and 321(1)–(N);
2. High-speed connection(s) to higher-level processors (e.g., redundant level-1 processors 350 and 351, and redundant route processors 360 and 361); and
3. High-speed connection(s) to matrix shelf processors 370(1)–(N) and 371(1)–(N) which, in turn, control matrix cards 380(1,1)–(1,N)), located in main matrix racks 390(1)–(N).

It will be noted that main matrix 214 includes matrix cards 380(1,1)–(1,N), and that, more generally, main matrices 214 and 218 are included matrix racks 390(1)–(N).

System switches 340 and 341 are located in a management bay. As noted, the fully redundant switches manage connections from various router elements, such as I/O and matrix bays, level-1 processors, and route processors. Each of level-1 processors 350 and 351 and route processors 360 and 361 is preferably connected to system switches 340 and 341 using 100 Mbps Ethernet connections in a configuration that creates an expandable, efficient, and fully redundant control bus.

Physical Configurations and Modules

System Modules

Line Card

Figure 4:
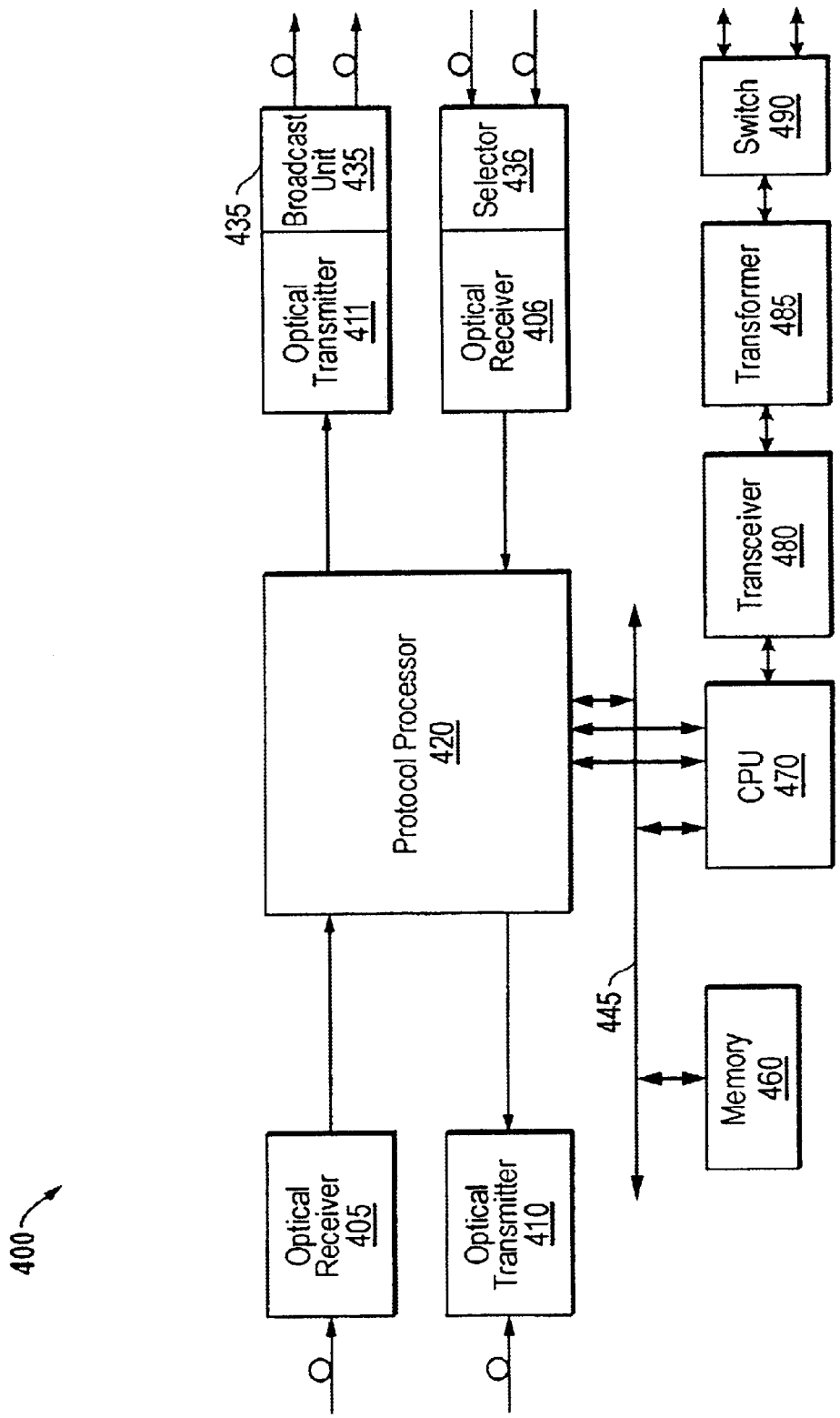
FIG. 4 illustrates the major components of one of the line cards.

FIG. 4 illustrates the major components of one of line cards 220(1,1)–(N,N), exemplified in FIG. 4 by a line card 400. A line card integrates all the necessary hardware and software functions to properly terminate the physical layer. In a SONET implementation, a line card terminates the transport overhead (Section+Line) of a full duplex OC-48 signal. Other components on this card provide a redundant optical connection to the switch matrix, and a communication channel to other modules in the system.

Line card 400 receives optical signals from other network elements via a line-side optical receiver 405 and from the local router's system via a system-side optical receiver 406. Each of these receivers implements an optical-to-electrical (O/E) conversion function. Line card 400 transmits optical signals to other network elements using a line-side optical transmitter 410 and to the group matrices using a system-side optical transmitter 411. Each of these transmitters implements an electrical-to-optical (E/O) conversion function. It will be noted that line-side refers to the side of the line card coupled to other network elements and system-side refers to the side of the line card coupled to the group matrices.

Line-side optical receiver 405 is coupled to a protocol processor 420 which performs clock recovery multiplexing, demultiplexing, and SONET STE/LTE processing in both directions. Similarly, system-side optical receiver 406 is also coupled to protocol processor 420 to allow protocol processor 420 to receive optical signals. The processed electrical signals from protocol processor 420 are coupled to the transmitters 410 and 411. The clock recovery functions are combined with demultiplexers and multiplexers to support reception and transmission of the optical data, respectively. The multiplexers serialize output data generated in protocol processor 420 by performing parallel-to-serial conversion on the parallel data. In contrast, de-multiplexers are used in protocol processor 420 to perform serial-to-parallel conversion on received data.

In order to add protection channels, line-side optical transmitter 410 is also coupled to a 1:2 broadcast unit 435. To receive such optical signals, optical receiver 406 is also coupled to a 2:1 selector 436 in order to select the working channel before the optical signals leave the shelf and thus prevent the standby channel (also referred to herein as the protect channel) from using any bandwidth on switching matrix 130.

Protocol processor 420 is coupled to a bus 445. Protocol processor 420 interfaces the line card to two copies of the matrix in a 1+1 physical protocol. In a SONET implementation, protocol processor 420 provides both STE/LTE processing according to published industry standards. Also coupled to bus 445 are a memory 460 and a CPU 470. Memory 460 should be fast enough for efficient operation of CPU 470.

CPU 470 communicates with other of line cards 220(1, 1)–(N,N) over a control bus (not shown) using a transceiver 480 that is coupled to CPU 470. Transceiver 480, is coupled to a transformer 485 which is coupled to a switch 490. Switch 490 is coupled to the control bus. Switch 490 implements a 1:1 protection scheme for transceiver 480 and couples CPU 470 to two independent ports on the backplane (not shown). Each of the two ports connects to one copy of the hub of the group matrix. This allows the software on the line card to switch to the backup link when the software detects failures on the active link.

Preferably, CPU 470 includes numerous integrated peripherals including embedded SCC channels (e.g., in-band communications) and an Ethernet controller (for example, to support communications with other system modules). In one embodiment, CPU 470 provides an onboard communications processor module (not shown) that handles time-critical aspects of the protocols supported.

Group Matrix Module

The group matrix module includes two independent blocks: a group matrix and a hub (also referred to herein as a repeater).

Group Matrix

A group matrix, such as group matrices 212(1)–(N) and 216(1)–(N), can include, for example, a series of 2:1 path selectors, broadcast units, and a microcontroller which controls the group matrix's elements. The selectors select one of two full-duplex optical signals and couple the selected signal to switching matrix 130. The selectors and broadcast units are typically grouped into pairs to form I/O channels. A processor (e.g., a microcontroller) communicates with other elements of router 100 via (preferably redundant) transceivers.

Hub

One or more hubs are also provided to support communication between the group matrices and system switches in router 100. In an Ethernet communications environment, the hub's functions are carried out primarily by repeater interface controllers (RICs). Each RIC integrates the functions of a repeater, clock and data recovery unit (CDR), Manchester encoder/decoder, and transceiver. Each RIC has a set of registers that convey status information and allow a number of configuration options to be specified by the user using, for example, a microcontroller.

Shelf Processor Module

A shelf processor module provides, among other elements, a shelf processor and switch that interconnect the LAN segments from the groups and the shelf processor to a port on the shelf switch. The shelf processor is responsible for the overall operation, management, and control of the shelf. A network switch interconnects the lower speed inter-processor communication network segments in each shelf. In one embodiment, the network switch provides support for 10 Mbps and 100 Mbps segments.

In certain embodiments, the shelf processor is able to connect to two separate Ethernet segments. This can implement a 1:1 protection scheme that allows the shelf processor to recover from failures on the active segment by simply switching to the other segment.

System Switch

One embodiment of a system capable of interconnecting network segments in a switched configuration allows communications between shelf switches, higher-level (e.g., level-1) processors, and shelf-processors. In an Ethernet-based system, the system switch supports both 10 Mbps and 100 Mbps connections. The segments come from the shelf switching in the I/O shelf and the matrix switches, among others, and allow these elements to communicate.

Management Bay

The management bay can house, for example, the following modules:
1. Level-1 processors (i.e., system controllers), and their associated storage devices;
2. Route processors;
3. Optional group and WAN cards;
4. System Ethernet switches; and
5. Synchronization modules.

All of the above modules are fully redundant and communicate with the rest of router 100 over redundant control buses. The placement of individual modules within the rack is not addressed in this document, since there are no architectural preferences, or restrictions, on such choices.

Level-1 Processor/System Controller

A system controller (also referred to herein as a level-1 processor) provides overall control of router 100. The system controller also communicates with the system switches. The system controller includes a bus (e.g., an all-purpose bus (APB)), which in turn provides access to several bus and communications controllers. Among controllers that can be interfaced to the APB is a bus bridge, a peripheral interface, and an I/O interface. The I/O interface may provide functionality such as 10 Mbps/100 Mbps Ethernet communications. The I/O interface also supports peripherals such as keyboards, mice, floppy drives, parallel ports, serial ports, and the like. The bus bridge allows communications between the system controller's processor and other devices. The peripheral interface allows communications with peripherals such as hard disks. The system controller performs various functions, such as communicating with the route processor(s) to determine how the matrix should be configured, managing the router's resources, and similar duties.

APB may also be connected to a dual-channel serial communication controller (SCC), for example, which can be used to communicate with one or more remote Operations Systems (OS) using, for example, the X.25 protocol. For more OS links and higher link speeds, the user can optionally install one or more WAN Interface Modules in the management bay. Such modules, which preferably handle all real-time aspects of the OS link, including layer-2 of the OSI stack, communicate with the system controller.

Figure 5:
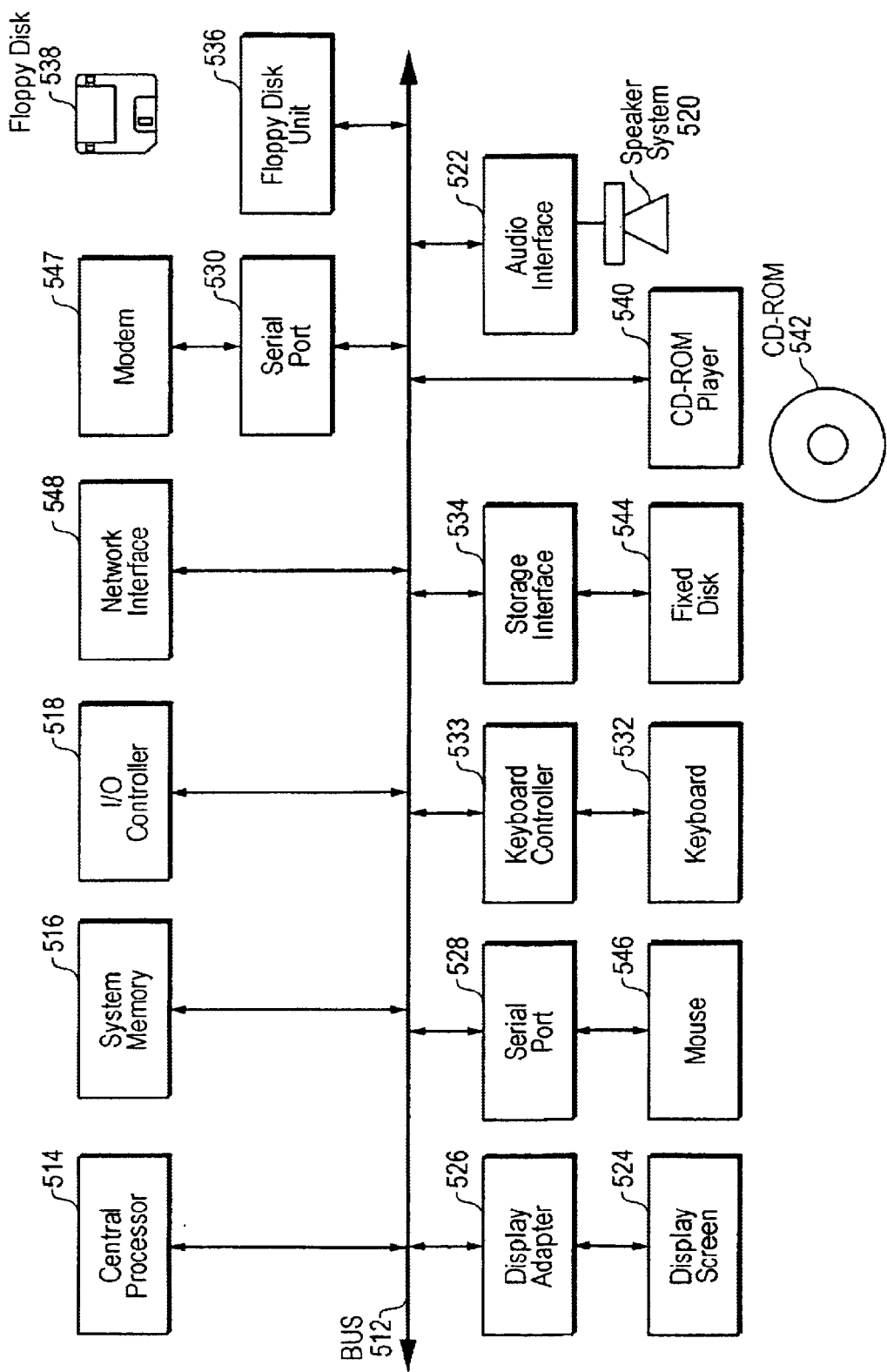
FIG. 5 illustrates an example embodiment of a system controller.

FIG. 5 depicts a block diagram of a computer system 510 suitable for implementing a system controller such as is described above. Computer system 510 includes a bus 512 which interconnects major subsystems of computer system 510 such as a central processor 514, a system memory 516 (typically RAM, but which may also include ROM, flash RAM, or the like), an input/output controller 518, an external audio device such as a speaker system 520 via an audio output interface 522, an external device such as a display screen 524 via display adapter 526, serial ports 528 and 530, a keyboard 532 (interfaced with a keyboard controller 533), a storage interface 534, a floppy disk drive 536 operative to receive a floppy disk 538, and a CD-ROM drive 540 operative to receive a CD-ROM 542. Also included are a mouse 546 (or other point-and-click device, coupled to bus 512 via serial port 528), a modem 547 (coupled to bus 512 via serial port 530) and a network interface 548 (coupled directly to bus 512).

Bus 512 allows data communication between central processor 514 and system memory 516, which may include both read only memory (ROM) or flash memory (neither shown), and random access memory (RAM) (not shown), as previously noted. The RAM is generally the main memory into which the operating system and application programs are loaded and typically affords at least 16 megabytes of memory space. The ROM or flash memory may contain, among other code, the Basic Input-Output system (BIOS) which controls basic hardware operation such as the interaction with peripheral components. Applications resident with computer system 510 are generally stored on and accessed via a computer readable medium, such as a hard disk drive (e.g., fixed disk 544), an optical drive (e.g., CD-ROM drive 540), floppy disk unit 536 or other storage medium. Additionally, applications may be in the form of electronic signals modulated in accordance with the application and data communication technology when accessed via network modem 547 or interface 548.

Storage interface 534, as with the other storage interfaces of computer system 510, may connect to a standard computer readable medium for storage and/or retrieval of information, such as a fixed disk drive 544. Fixed disk drive 544 may be a part of computer system 510 or may be separate and accessed through other interface systems. Many other devices can be connected such as a mouse 546 connected to bus 512 via serial port 528, a modem 547 connected to bus 512 via serial port 530 and a network interface 548 connected directly to bus 512. Modem 547 may provide a direct connection to a remote server via a telephone link or to the Internet via an internet service provider (ISP). Network interface 548 may provide a direct connection to a remote server via a direct network link to the Internet via a POP (point of presence).

Many other devices or subsystems (not shown) may be connected in a similar manner. Conversely, it is not necessary for all of the devices shown in FIG. 5 to be present to practice the present invention. The devices and subsystems may be interconnected in different ways from that shown in FIG. 5. The operation of a computer system such as that shown in FIG. 5 is readily known in the art and is not discussed in detail in this application. Code to implement the present invention may be operably disposed or stored in computer-readable storage media such as one or more of system memory 516, fixed disk 544, CD-ROM 542, or floppy disk 538.

It will be noted that the variable identifier "N" is used in several instances in FIG. 5 to more simply designate the final element (e.g., servers 110(1)–(N) and client terminals 112 (1)–(N)) of a series of related or similar elements (e.g., servers and client terminals). The repeated use of such variable identifiers is not meant to imply a correlation between the sizes of such series of elements, although such correlation may exist. The use of such variable identifiers does not require that each series of elements has the same number of elements as another series delimited by the same variable identifier. Rather, in each instance of use, the variable identified by "N" may hold the same or a different value than other instances of the same variable identifier.

Moreover, regarding the signals described herein, those skilled in the art will recognize that a signal may be directly transmitted from a first block to a second block, or a signal may be modified (e.g., amplified, attenuated, delayed, latched, buffered, inverted, filtered or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The foregoing described embodiment wherein the different components are contained within different other components (e.g., the various elements shown as components of computer system 510). It is to be understood that such depicted architectures are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

Route Processor Module

A route processor is a high-speed processor subsystem with relatively limited I/O capabilities. The route processor functions to receive link-failure indications from the line cards (not shown), computes an alternate route for failed connections-using a restoration protocol such as that described in the co-pending application entitled "A METHOD FOR ROUTING INFORMATION OVER A NETWORK" and previously included by reference herein, and then sends one or more configuration requests to all affected nodes to achieve this new routing. The route processor is able to communicate directly with all system modules, including the line cards and the matrix shelf processors via a redundant high speed network connection to the system switch. In systems using Ethernet as the communication mechanism, the route processor can communicate with these elements via a redundant 100 Mbps connection to the system Ethernet switch, for example. The route processor runs the software implementing a routing protocol such as that mentioned above. The route processor communicates with other systems of router 100 using, for example, an Ethernet communications mechanism. The route processor can be provided with a redundant connection to the other systems of router 100 to allow uninterrupted operation in the event of a communications failure.

System Switch

A system switch suitable for use in can use Ethernet-based communications to communicate with other of the subsystems of router 100, for example. In an Ethernet configuration, the system switch manages the Ethernet connections from all level-1, level-2, route, and optional Wide Area Network (WAN) processors. The system switch implements a high-speed, low-latency Ethernet switch that isolates local traffic to individual segments. The core of system switch is a switch matrix. In one embodiment, the switch matrix is an eight port bus that interconnects switch port controllers, one or more high-speed interfaces (e.g., a gigabit Ethernet switch port controller), and expansion ports. Each one of the expansion ports communicates with a corresponding expansion bus. Each copy of the system switch thus supports communications with level-1 processors, route processors, each I/O bay, and each matrix shelf processor. In Ethernet-based systems, these connections may be by 100 Mbps or 10 Mbps connections.

Main Matrix Bay

Switching matrix 130 is based on a rearrangeably non-blocking switching matrix and can consist, for example, of switch nodes arranged in a staged array. For example, switching matrix 130 configured as a 556×256 switching matrix consists of 48 nodes arranged in an array of 16 rows by 3 columns, with each column containing one stage. All 48 nodes in the switch matrix are substantially similar. Each node is preferably a crossbar device, such as a 16×16 crossbar device that allows any of its 16 inputs to be connected to any of its 16 outputs, regardless of the crossbar's current state.

Matrix Shelf Processor Module

The matrix shelf processor module provides local control and management for one of the main-matrix shelves. The matrix shelf processor communicates with the level-1 and route processors over a low speed network connection and with the matrix node cards over a multi-drop, low-speed bus.

A matrix shelf processor provides local control and management for one of the shelves of a main matrix such as switching matrix 130. The core of a matrix shelf processor is a matrix shelf processor CPU, which communicates with one or more level-1 processors and route processors via a transceiver (preferably a 10BASE-T transceiver). The matrix shelf processor CPU communicates with system switches of the matrix shelf processor via a transceiver. To support these functions, the matrix shelf processor CPU is coupled via a processor bus to memory that provides storage for various software modules run by the matrix shelf processor CPU.

Main Matrix

Figure 6:
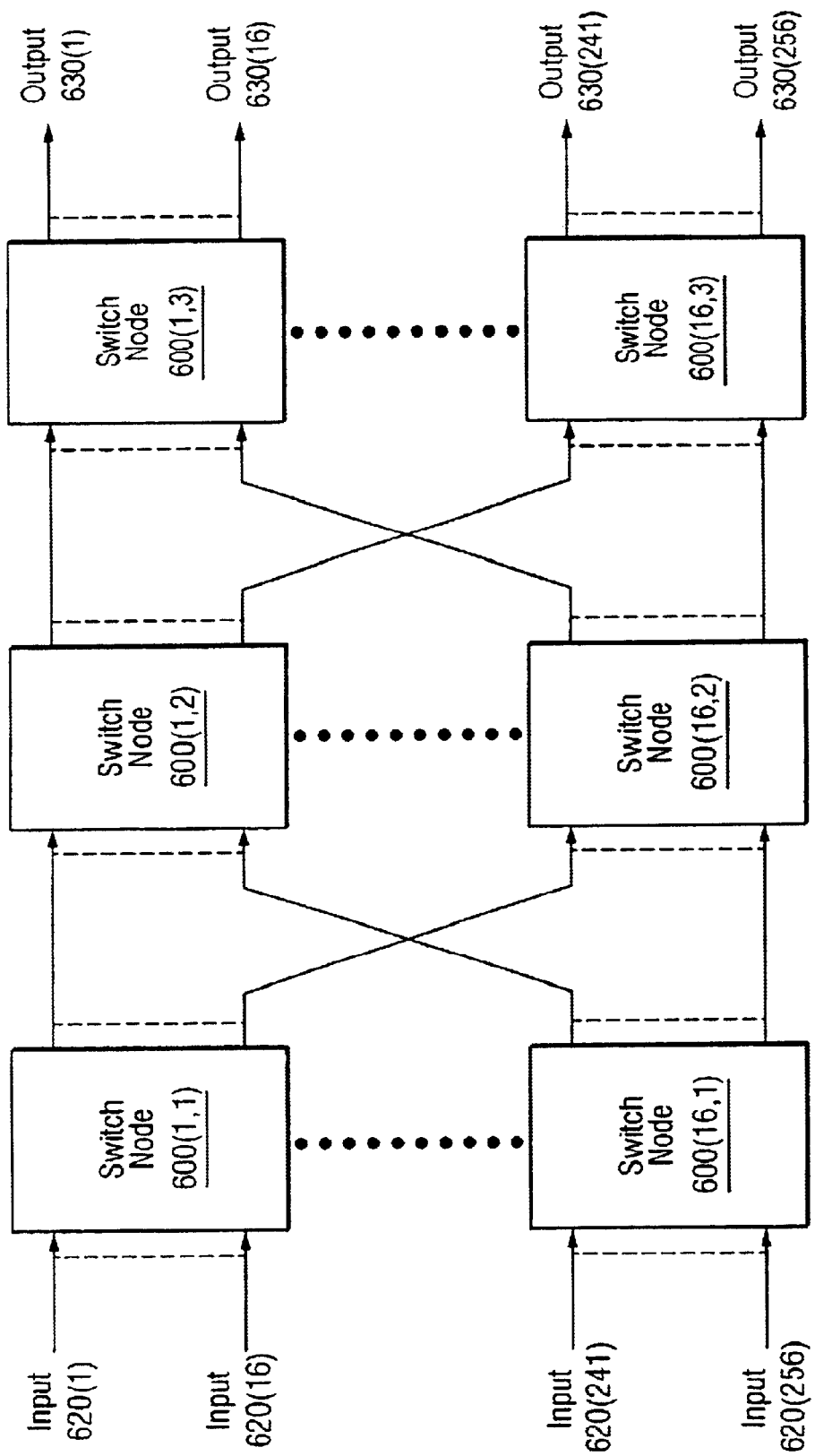
FIG. 6 illustrates the structure of a switching matrix.

FIG. 6 illustrates switching matrix 130 configured in the manner of the switch matrix described previously. In one embodiment, switching matrix 130 employs a 556×256 matrix, an array of switching nodes 600(1,1)–(16,3), each of which is a 16×16 crossbar switch that allows any input signal to be connected to any of its outputs, regardless of the current state of the crossbar. Each of the interconnections between switching nodes 600(1,1)–(16,3) can be implemented, for example, using 5.5 Gbps interconnections. As noted, the embodiment illustrated in FIG. 6 supports the switching of up to 556 inputs, shown as inputs 620(1)–(256). Inputs 620(1)–(256) are switched to one of outputs 630(1) –(256).

Physically, each of the 48 switching nodes of this embodiment occupies a single slot in a matrix rack, such as that described below. The rack described below is arranged with three shelves (one per matrix column) that house the switch node cards (there are 16 such cards in every shelf) and six-shelf-processor cards (two per shelf).

Matrix Rack

A rack is used to hold one or more matrices, and is referred to herein as a matrix rack. In one embodiment, a matrix rack is configured to hold 48 switching nodes (i.e., switching nodes 600(1,1)–(16,3)) in a compact physical configuration. The matrix rack thus can support, for example, switching nodes 600(1,1)–(16,3), which each provide 16 input signals and 16 output signals, and thus provides switching matrix 130 with 556 input signals and 556 output signals. Matrix shelf processors are configured in redundant pairs to provide fault-tolerant control of switch nodes 600(1,1)–(16,3).

The cross-connect information, i.e., input-to-output mapping, is written into the crosspoint switch by a local microcontroller which receives the information from the local shelf processor over a high-speed connection. The three shelf processors in each rack receive such information from the node controller, which resides in a different rack. This hierarchy can be extended indefinitely. The crosspoint switch receives a high speed serial data from the optical receivers that perform optical-to-electrical conversion on the received optical signals. Data from the crosspoint switch is re-timed to synchronize the data with the system clock of router 100, using a clock and data recovery (CDR) unit, before being converted back into an optical signal that connects to the next stage of the matrix over fiber-optic cables.

Switch Node Module

Figure 7:
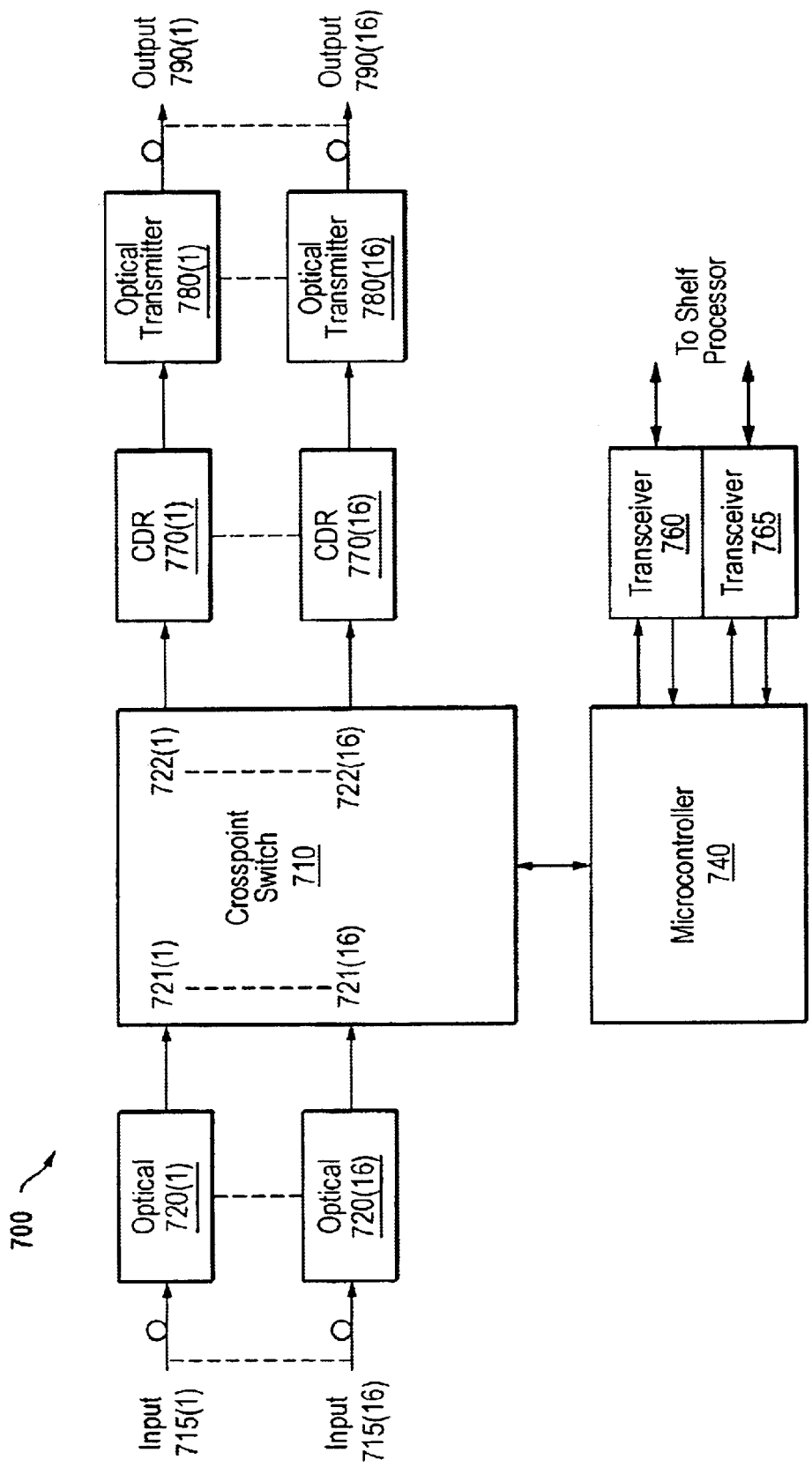
FIG. 7 illustrates a switching node.

FIG. 7 illustrates one of switching nodes 600(1,1)–(16,3) as a switching node 700. Switching node 700, in one embodiment, is a complete, strictly non-blocking, 16×16 OC-48 multi-stage crossbar matrix which allows any of its inputs to be connected to any of its outputs regardless of the current state of the matrix. A crosspoint switch 710 is controlled by a local microcontroller (a microcontroller 740) that also manages the optical transceivers, CDRs, and onboard SONET device. Configuration information is downloaded to switch node 700 from microcontroller 740 over a low-speed bus.

The block diagram of switch node 700 in FIG. 7 illustrates the main elements of a switch node using a SONET-based implementation. The core of the switch node 700 is crosspoint switch 710, which is a 16×16 crossbar switch (when implementing a 556×256 matrix). Crosspoint switch 710 is preferably a 5.5 Gbps 16×16 differential crosspoint switch with full broadcast capability. Any of its input signals can be connected to any, or all, of its output signals. The device is configured through a low-speed port that, through a two-step/two-stage process, allows changes to be made to switch configuration without disturbing its operation.

Assuming 16 input signals (indicated in FIG. 7 as inputs 715(1)–(16)), crosspoint switch 710 is configured to receive optical input signals from optical receivers 720(1)–(16) at switch input signals 721(1)–(16). Crosspoint switch 710 also provides switch outputs 722(1)–(16) which serve as the source of output signals for switch node 700. Microcontroller 740 communicates with the shelf processor via transceivers 760 and 765 over a bus that carries asynchronous data over the backplane (not shown). Incoming signals are routed to one of switch outputs 722(1)–(16). Switch outputs 722(1)–(16) are coupled to CDRs 770(1)–(16), which in turn drive optical transmitters 780(1)–(16). The outputs from optical transmitters 780(1)–(16) appear at outputs 790(1)–(16) as optical signals.

Figure 8:
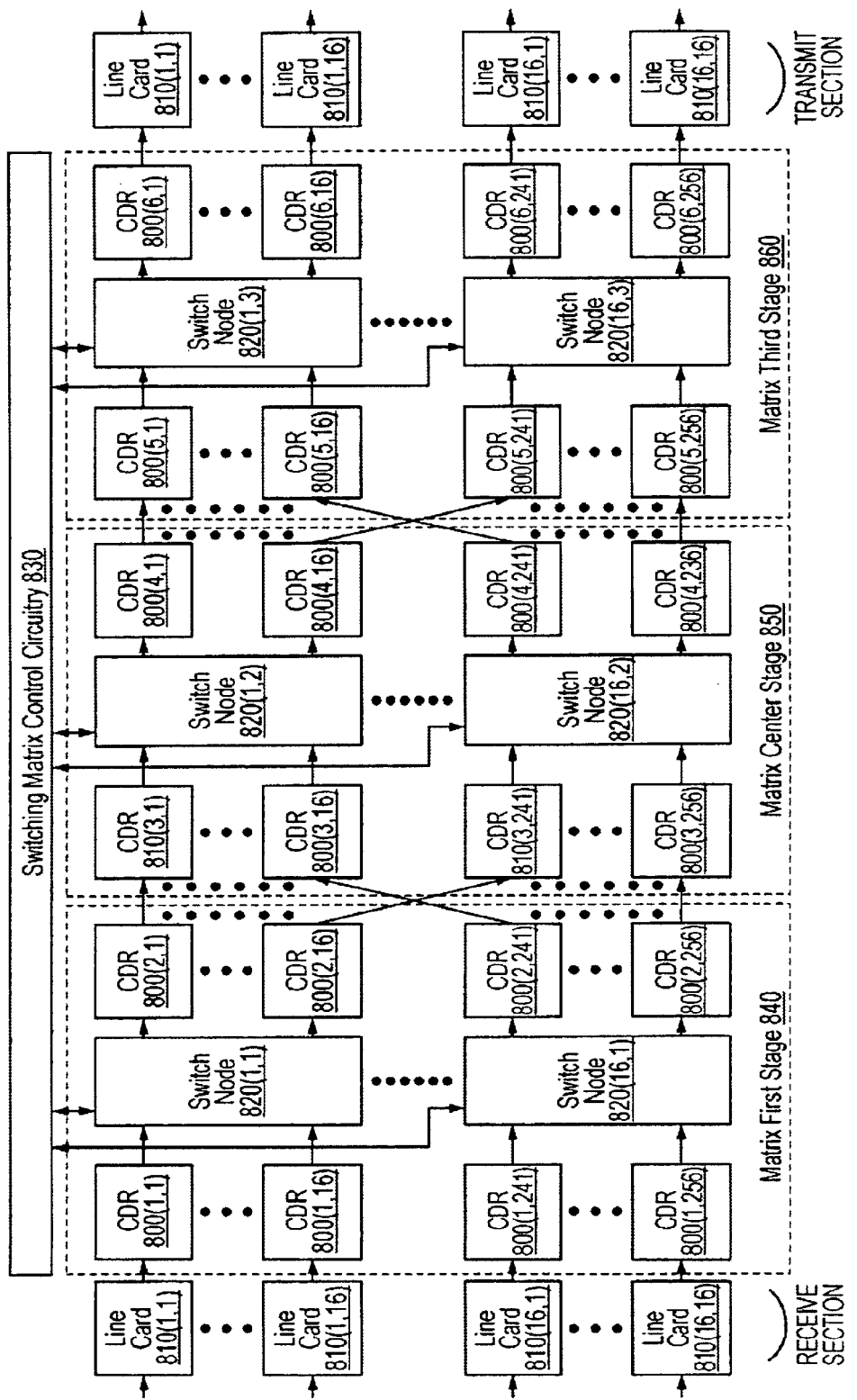
FIG. 8 illustrates a view of a switching matrix that includes clock/data recovery units and connections to the line cards.

FIG. 8 illustrates a simplified view of switching matrix 130, including connections to the line cards. The depiction of switching matrix 130 in FIG. 8 shows certain other details, such as clock/data recovery units (CDRs) 800(1,1)–(6,256) and line cards 810(1,1)(16,16). A CDR recovers clock and data information from a serial bitstream by recovering the clocking signal from the incoming bitstream (e.g., using a phase-locked loop (PLL)), and then recovering the data using the clock thus recovered.

It will be noted that line cards 810(1,1)–(16,16) correspond loosely to line cards 520(1,1)–(N,N), as depicted in FIG. 5. It will also be noted that line cards 810(1,1)–(16,16) are each shown as being divided into a receive section and a transmit section as shown in FIG. 8, again in a fashion similar to that depicted in FIG. 5. Also depicted in FIG. 8 are switch nodes 820(1,1)–(16,3) and a switching matrix control circuit 830. Switch nodes 820(1,1)–(16,3) correspond to switch nodes 600(1,1)–(16,3) of FIG. 6, and may be implemented as shown in FIG. 7, for example. Switching matrix control circuitry 830 includes elements such as a microcontroller and a matrix shelf processor. More generically, the control function represented by switching matrix control circuitry 830 is depicted in FIG. 3 as matrix shelf processors 370(1)–(N) and 371(1)–(N). As previously noted, switch nodes 820(1,1)–(16,3) and their related CDRs are divided into three stages, which are depicted in FIG. 8 as matrix first stage 840, matrix center stage 850, and matrix third stage 860. It will be noted that matrix first stage 840, matrix center stage 850, and matrix third stage 860 correspond to the matrix stages represented by switch nodes 600(1,1)–(16,1), switch nodes 600(1,2)–(16,2), and switch nodes 600(1,3)–(16,3). It will also be noted that the transmit side of line cards 810(1,1)–(16,16) each include CDR functionality.

Figure 9:
FIG. 9 illustrates the layout of a standard frame of the synchronous optical network (SONET) protocol.

FIG. 9 illustrates a standard frame of the synchronous optical network (SONET) protocol, exemplified here by a SONET frame 900. SONET frame 900 is divided horizontally into ninety columns and is divided vertically into nine rows. The first three columns of SONET frame 900 contain overhead bytes used for framing, communications, and other purposes. The remaining 87 columns contain data and are collectively referred to as payload. The overhead bytes include an A1 byte 902, an A2 byte 904, a J0/Z0 byte 906, a B1 byte 910, an E1 byte 912, an F1 byte 914, a D1 byte 920, a D2 byte 922, a D3 byte 924, an H1 byte 930, an H2 byte 932, an H3 byte 934, an H4 byte 936, a B2 byte 940, a K1 byte 942, a K2 byte 944, a D4 byte 950, a D5 byte 951, a D6 byte 952, a D7 byte 953, a D8 byte 954, a D9 byte 955, a D10 byte 956, a D11 byte 957, a D12 byte 958, an S1/Z1 byte 970, an M1/Z2 byte 972, and an E2 byte 974. Also included in SONET frame 900 is payload data, represented here by payload bytes 990–998. It will be noted that each of payload bytes 990–998 includes 87*48 bytes of data for an OC-48 SONET frame (except payload bytes 993, which includes 86*48 bytes of data (due to the existence of H4 byte 936)).

It will be noted that certain of the overhead bytes in FIG. 9 are marked with the letter U. This indicates the bytes so marked are stripped off by protocol processor 420 and are thus unused in the switching of the data streams represented by SONET frame 900 while the data is within router 100. In certain embodiments of the present invention, switching is performed during the period of time corresponding to one or more of these overhead bytes. Thus, a frame having such unused periods therein that can be used to allow errorless switching in the switching matrix of a network element such as router 100 (e.g., switching matrix 130) is referred to herein as a backplane frame.

Alternatively, in other embodiments of the present invention, these overhead bytes and the payload are rearranged in order to further support errorless switching in a switching matrix such as switching matrix 130 by providing a longer period of time during which switching operations may be performed. In one embodiment, the overhead bytes are moved to the beginning of the frame used to transport data through a system such as router 100. By moving the overhead bytes to the beginning of the frame, the byte times are concatenated in order to support the relock of the CDRs within router 100 by increasing the time available for relock. The overhead bytes in FIG. 9 marked with the letter U, and so stripped off by protocol processor 420, are preferably the bytes "rearranged" to form an extended period of time during which relocking can occur. In fact, because these bytes are stripped off, other bytes are simply moved into their position, overwriting the stripped-off bytes and making room at the beginning of the frame for the relocking operation. One example of such a rearranged frame, referred to herein as an errorless switching frame (ESF, a specific type of backplane frame), is given below.

Figure 10:
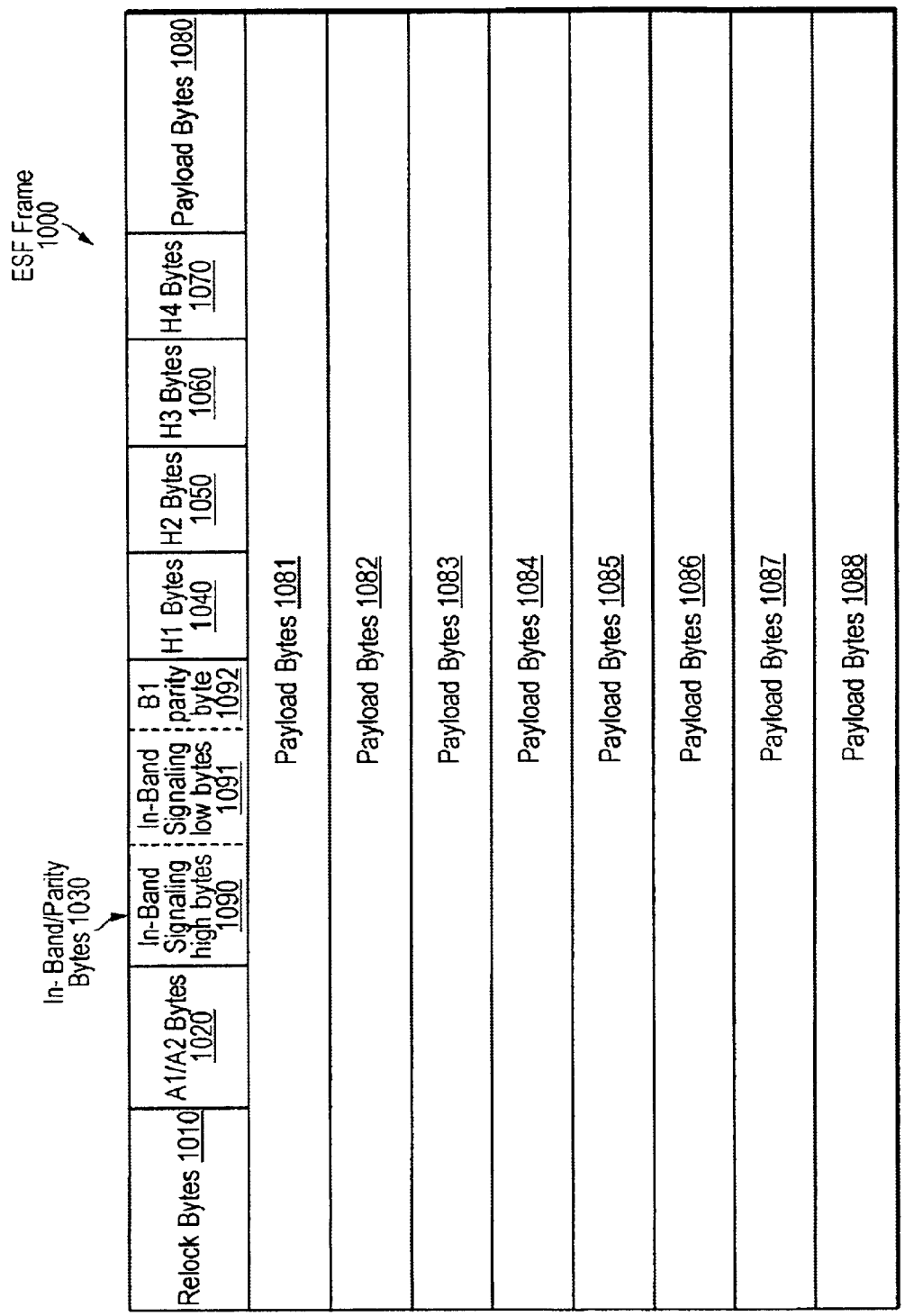
FIG. 10 illustrates the layout of one embodiment of an errorless switching frame.

FIG. 10 illustrates one embodiment of an ESF 1000, generated by rearranging a SONET frame received by router 100. ESF 1000 includes relock bytes 1010, A1/A2 bytes 1020 (corresponding to A1 byte 902 and A2 byte 904 of SONET frame 900), in-band/parity bytes 1030, H1 bytes 1040 (corresponding to H1 byte 930 of SONET frame 900), H2 bytes 1050 (corresponding to H2 byte 932 of SONET frame 900), H3 bytes 1060 (corresponding to H3 byte 934 of SONET frame 900), H4 bytes 1070 (corresponding to H4 byte 936 of SONET frame 900), and payload bytes 1080–1088 (corresponding to payload bytes 990–998 of SONET frame 900). In protocol processor 420 (of FIG. 4), the overhead bytes of SONET frame 900 marked as unused ("U") are "moved" to the position of relock bytes 1010 (as well as A1/A2 bytes 1020 and in-band/parity bytes 1030) by moving payload or control information into the unused bytes. In effect, the overhead bytes of SONET frame 900 marked as unused can simply be overwritten when rearranging the frame. The data is preferably rearranged such that a relatively large number of bytes at the beginning of the frame are made available for use in performing the errorless switching operation, and most preferably, that a maximum number of bytes at the beginning of the frame are made available for such purposes.

Relock bytes 1010 are inserted in place of these first bytes. Relock bytes 1010 preferably consist of data that will create signals rich in transitions. This eases the CDRs' task of re-acquiring phase lock, because each transition is an opportunity for the CDRs' to begin the process of re-acquiring clocking information. One example of a bit pattern rich in transitions is a binary representation of the hexadecimal number "55", which produces a string of alternating 1's and 0's (with a transition between each bit time).

A1/A2 bytes 1020 represent A1 byte 902 and A2 byte 904 from 48 STS-1 channels in an OC-48 signal. A1/A2 bytes 1020 may include, for example, 54 bytes of the A1 framing byte and 54 bytes of the A2 framing byte. In-band bytes 1030 may be divided into an in-band signaling high byte 1090, an in-band signaling low byte 1091, and a parity value (referred to herein as a backplane parity byte 1092). The next four portions of ESF 1000 are pointer and payload bytes from the 48 STS-1 channels supported by the OC-48 SONET frame. H1 bytes 1040 include the H1 pointer bytes from each of the 48 STS-1 channels. In similar fashion, H2 bytes 1050 contain the H2 pointer bytes from those STS-1 channels, H3 bytes 1060 contain the H3 stuff bytes from the 48 STS-1 channels, and H4 bytes 1070 contain the 48 H4 stuff bytes from the 48 STS-1 channels. Payload bytes 1080–1088 contain their respective portions of the payload bytes of the 48 STS-1 channels supported by the OC-48 stream.

In one embodiment, in-band/parity bytes 1030 are actually a 48-byte column in which three of the bytes are used for in-band signaling high byte 1090, in-band signaling low byte 1091, and backplane parity byte 1092, with the remaining 45 bytes being reserved. While the H1, H2, and H3 bytes of each of the STS-1 channels of the OC-48 stream are defined, in some embodiments, the H4 byte of each channel can be considered to be part of the SONET payload. The various fields in row 1 of ESF 1000 are shown in Table 1.

TABLE 1

Detail of an exemplary layout of errorless switching frame 1000.

| Row 1 Byte Numbers | # of Bytes | Overhead Byte Name | Notes |
|---|---|---|---|
| 1–1056 | 1056 | 1056 - RLK bytes | Used to relock CDRs. Relocking pattern is preferably transition (edge) rich (e.g., a pattern of 0x55) |
| 1057–1080 | 24 | 24 - A1 bytes | Framing Byte. A1 pattern = 0xF6 |
| 1081–1104 | 24 | 24 - A2 bytes | Framing Byte. A2 pattern = 0x28 |
| 1105 | 1 | 1 - IBH byte | Inband Signaling High-byte |
| 1106 | 1 | 1 - IBL byte | Inband Signaling Low-byte |
| 1107 | 1 | 1 - Backplane Parity Byte | Backplane Parity Byte |
| 1108–1152 | 45 | 45 - Reserved bytes | Fixed pattern = 0x00. Reserved. |
| 1153–1200 | 48 | 48 - H1 bytes | Pointer Byte. H1 = H1 pointer byte |
| 1201–1248 | 48 | 48 - H2 bytes | Pointer Byte. H2 = H2 pointer byte |
| 1249–1296 | 48 | 48 - H3 bytes | Pointer Byte. H3 = H3 pointer action stuff byte |
| 1297–1344 | 48 | 48 - H4 bytes | Payload Byte. H4 = stuff byte position |
| 1345–4320 | 2976 | 2976 - Payload bytes | Payload Bytes |

As noted, relock bytes 1010 preferably contained a pattern of 1's and 0's (e.g., a hexadecimal value of "55"). This pattern is used to help the CDRs along the signal path within router 100 to re-acquire phase lock quickly during the rearrangement of switching matrix 130 by providing a signal rich in edges (i.e., transitions) on which the PLLs of the CDRs can acquire lock. A1/A2 bytes 1020 are framing bytes that preferably use a standard SONET format of 0xF6 and 0x28, respectively. A full column of A1 and A2 bytes are preferably used to form A1/A2 1020. As noted, in-band signaling high byte 1090 and in-band signaling low byte 1091 are provided to support in-band signaling, and so allow communication on an in-band basis over a network such as network 190. As will be apparent to one of skill in the art, the above format is merely exemplary. The information illustrated above may be organized in an alternate format, and various pieces of information omitted from ESF frame 1000, or included in ESF frame 1000 from SONET frame 900.

To help ensure the accurate transmission of data, backplane parity byte 1092 is provided to allow parity checking through a system such as router 100. Backplane parity byte 1092 can be calculated using any number of parity calculations, but is preferably calculated using the standard SONET definition. Backplane parity byte 1092 is preferably calculated across all bytes in ESF 1000, save for relock bytes 1010, and A1/A2 bytes 1020. Relock bytes 1010 and A1/A2 bytes 1020 are excluded from this calculation to avoid the detection of false parity errors during the rearrangement of switching matrix 130. At such a time, the system will not be able to capture relock bytes 1010 and A1/A2 bytes 1020. The generation and checking of backplane parity byte 1092 is described in further detail with regard to FIGS. 11, 12, 13 and 14.

As noted, the undefined bytes following in-band/parity bytes 1030 are reserved and so are preferably set to a hex value of 0x00. In-band/parity bytes 1030 and the undefined bytes which follow thus define a 48-byte column. H1 bytes 1040, H2 byte 1050, and H3 bytes 1060 are pointer bytes into the payload of the original SONET frame. In one embodiment, there are 48 copies of each of these bytes in order to support the 48 STS-1 channels in an OC-48 stream. Preferably, the values carried in H1 byte 1040 and H2 byte

1050 are modified from the standard SONET definition to allow for the different locations of various payload bytes in ESF 1000. In a similar fashion, there are 48 copies of each STS-1 channel's H4 byte that make up H4 bytes 1070, and it is the H4 byte that is used as a stuff position during pointer justifications (although the H4 byte may be considered as a part of the payload). Preferably, scrambling is used on data sent over the signal paths of router 100. More preferably, all bytes in ESF 1000 are scrambled with the exception of relock bytes 1010 and A1/A2 bytes 1020. While any acceptable method may be used for this scrambling, a standard SONET scrambling polynomial is preferably used for the scrambling pattern.

While it may be preferable to rearrange incoming data streams to allow for errorless switching, depending on the amount of time required for various elements of router 100 to reacquire lock, such rearrangement of the incoming data stream is not strictly necessary. In fact, if switching and resynchronization can be performed quickly enough, no rearrangement whatever need be performed. This may depend not only on the speed with which the hardware is capable of re-acquiring lock, but on the amount of contiguous unused data at the beginning of a frame available for use in the switching operation, due either to the underlying protocol employed or the transmission of a special frame that allows for such switching. Thus, given a sufficient period of time (a sufficient number of unused bit times) at the beginning of a frame, no arrangement may be needed to perform errorless switching according to embodiments of the present invention.

Alternatively, the signal paths of a system such as router 100 may be operated at a speed higher than that of the incoming data stream. In such a case, more byte positions will exist per unit time than exist bytes from the incoming data stream. In such a scenario, a number of system-defined bytes would be inserted before the bytes from the incoming data stream are received. Among other possible uses of these system-defined bytes would be the possibility of provided relocking bytes (e.g., relock bytes 1010) which could be corrupted (as they might be during the switching of a switching matrix such as switching matrix 130) without deleterious effects on the "live" data channels carried over the incoming data stream. These relocking bytes would also serve to support fast re-acquisition of lock by the CDRs within the system.

FIG. 5 depicts exemplary components of protocol processor 420 that allow protocol processor 420 to support the errorless rearrangement functions described previously. Errorless matrix rearrangement support is provided in protocol processor 420 such that switch matrix 130 can be rearranged without causing any loss of data on active channels.

To support the errorless rearrangement technique, the input/output connections to and from the matrix are maintained during a matrix rearrangement. Only paths internal to switching matrix 130 are altered during the rearrangement. As noted, switching matrix 130 incorporates several clock/data recovery units (CDRs) in the signal path from matrix input to matrix output. These CDRs are configured in a serial sequence through the matrix, such that when the serial data signal is disrupted (e.g., due to a switch change), the CDRs reacquire lock one at a time, in a serial fashion. During the period of time that the CDRs are re-acquiring lock, the "clock" into protocol processor 420 is of unknown frequency and period. The errorless rearrangement support circuitry in protocol processor 420 is responsible for "blocking" the transmit input clock during the rearrangement (when the clock is not known), turning the clock back on when the clock again becomes clean, and finally, to reframe to the newly received serial data stream immediately and begin passing data. Thus, the data stream traversing the router's backplane can contain periods of unreliable clocking information which should not be examined while performing error detection.

Figure 11:
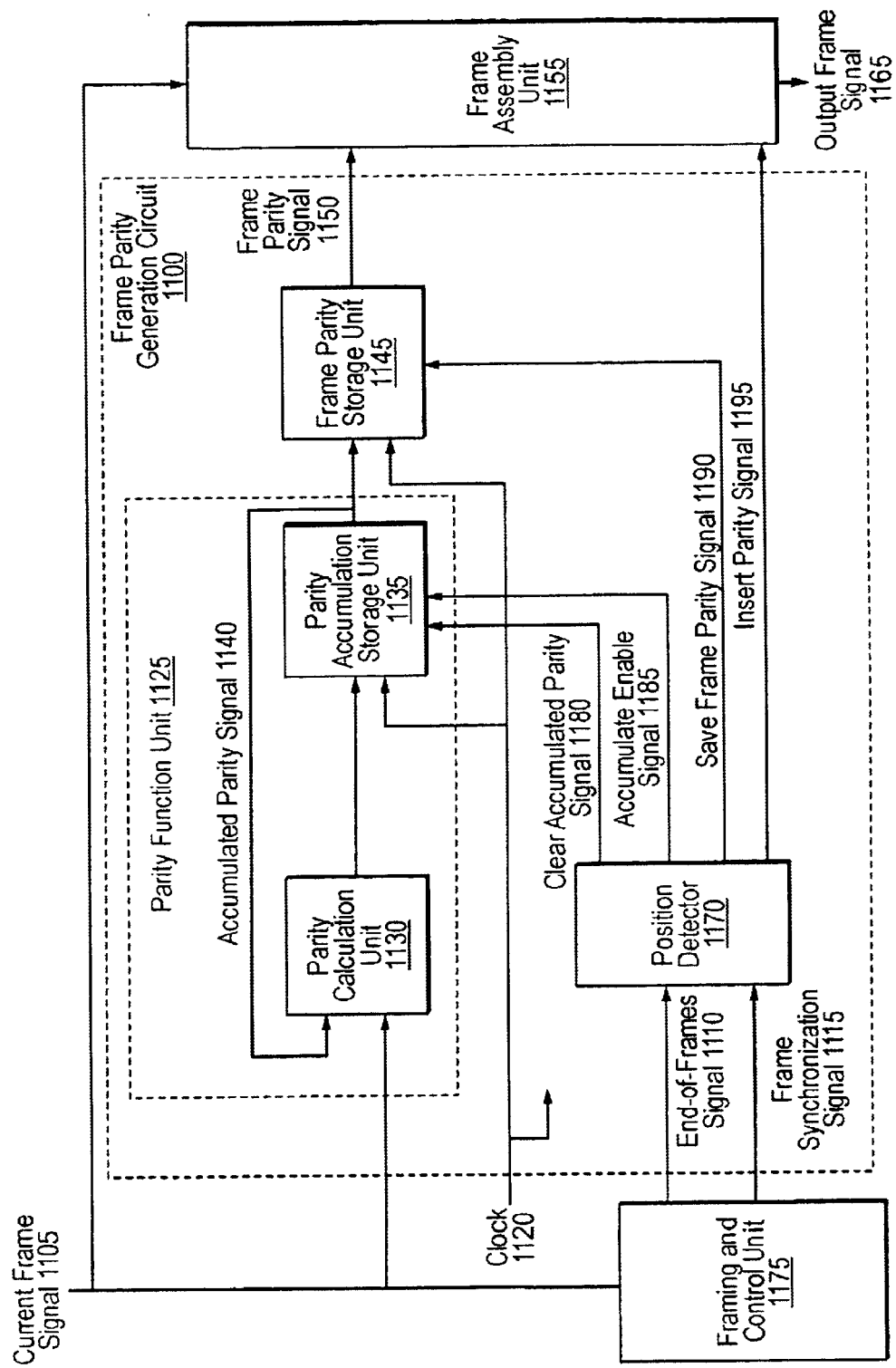
FIG. 11 is a block diagram illustrating a frame parity generation circuit according to an embodiment of the present invention.

FIG. 11 is a block diagram illustrating a frame parity generation circuit 1100 according to an embodiment of the present invention. Frame parity generation circuit 1100 takes as its input a current frame signal 1105, a end-of-frame signal 1110 and an frame synchronization signal 1115. Current frame signal 1105 represents the current word of the frame currently being analyzed. The word length may be any suitable value, and can be, for example, one byte (i.e., eight bits). This is the case when a bit-interleaved parity (BIP) calculation such as BIP8 (8 bit interleaved parity, such as that used in the SONET standard) is performed. Also provided to frame parity generation circuit 1100 is a clock 1120. Clock 1120 is derived from a standard system clock distributed throughout the backplane of router 100. Clock 1120 allows frame parity generation circuit 1100 to determine when inputs thereto are valid.

Current frame signal 1105 is provided to a parity function unit 1125, containing a parity calculation unit 1130 and a parity accumulation storage unit 1135. Parity calculation unit 1130, which performs a parity calculation using the current word of the frame for which parity is being calculated (carried by current frame signal 1105) and the parity presently accumulated for the frame (carried by an accumulated parity signal 1140). Parity calculation unit 1130 can perform, for example, a bit-wise exclusive-OR (XOR) of current frame signal 1105 and accumulated parity signal 1140, although other calculations to generate parity can be used with equal success, as will be apparent to one of skill in the art. As shown in FIG. 11, accumulated parity signal 1140 is provided to parity calculation unit 1130 by parity accumulation storage unit 1135. Parity accumulation storage unit 1135 supports parity generation (e.g., the bit-wise XOR of the current word (e.g., of 8 bits in length) with the accumulated parity value, by accumulating (i.e., storing) the result of the parity calculation generated by parity calculation unit 1130. Thus, as words of the given frame are presented on current frame signal 1105, parity calculation unit 1130 generates the next parity value to be accumulated (i.e., stored in parity accumulation storage unit 1135).

Once the calculations are complete for the given frame, the parity value stored in parity accumulation storage unit 1135 is stored in a frame parity storage unit 1145. Frame parity storage unit 1145 stores the given frame's parity value for insertion into a subsequent frame. This is accomplished by providing the frame's parity value (as a frame parity signal 1150) to a frame assembly unit 1155 during the assembly of the subsequent frame. Frame assembly unit 1155 takes as its input information for the subsequent frame, into which frame assembly unit 1155 inserts the frame's parity value at the proper time (i.e., the point in the subsequent frame's data stream to be occupied by the backplane parity byte). The assembled frame, including the previous frame's parity value, is output by frame assembly unit 1155 as an output frame signal 1165.

Alternatively, the preceding operation can be described in terms of a given frame and a frame previous to the given frame. The previous frame's parity value, having been calculated by parity function unit 1125 and stored in frame parity storage unit 1145, is available for insertion into the frame currently being analyzed. Thus, the previous frame's parity value is inserted into the position in the current frame reserved therefore.

Parity function unit 1125 and frame parity storage unit 1145 are controlled by a position detector 1170. Position detector 1170 can, for example, take as input end-of-frame signal 1110, frame synchronization signal 1115 and clock 1120, and generates signals that control the calculation of a frame's parity, and the insertion of the parity value thus calculated into a subsequent frame. End-of-frame signal 1110 indicates the end of a frame to position detector 1170, while frame synchronization signal 1115 indicates that framing is being acquired. End-of-frame signal 1110 and frame synchronization signal 1115 can be generated, for example, by a framing and control unit 1175, which analyzes the current frame (and, optionally, preceding frames) to determine if the system is "framed up" (synchronized to the frame) and the current word's position in the given frame.

Position detector 1170 generates several signals that control parity function unit 1125 and frame parity storage unit 1145, as well as frame assembly unit 1155 (in part). Initially, position detector 1170 asserts a clear accumulated parity signal 1180, which clears parity accumulation storage unit 1135. The cleared value in parity accumulation storage unit 1135 can then be read into frame parity storage unit 1145 to clear that storage unit as well. Alternatively, frame parity storage unit 1145 could be cleared using a clear signal (in fact, clear accumulated parity signal 1180 could also be provided to frame parity storage unit 1145 to accomplish this function).

Once frame synchronization signal 1115 indicates that the data stream is framed, position detector 1170 uses end-of-frame signal 1110 to determine the occurrence of both the end of a frame and the beginning of a frame. Once the given backplane frame begins, position detector 1170 determines whether to include a given word in that backplane frame's parity value by determining the given word's position in the backplane frame. The determination is made based on either existing knowledge (certain bytes are never reliable) or dynamically acquired knowledge (certain bytes are unreliable in certain situations). For example, there may be no way to know if the bytes used to support relocking (i.e., relock bytes 1010) will be corrupted by a switching operation (i.e., one or more of relock bytes 1010 may contain errors introduced by a switching operation). However, it may be that framing bytes can be generally relied on unless frame is lost. Thus, position detector 1170 can be designed to always include or exclude certain word in the parity calculation, or to include or exclude certain word in the parity calculation based on dynamic criteria (e.g., input signals, counts and the like). In FIG. 11, position detector 1170 accomplishes this inclusion/exclusion by asserting and de-asserting an accumulate enable signal 1185 provided to parity accumulation storage unit 1135 based on end-of-frame signal 1110, frame synchronization signal 1115 and clock 1120.

As noted, there are words in a backplane frame that should not be included in parity calculations due to their unreliability. With regard to a backplane frame (e.g., an ESF), such is the case for the words within a backplane frame that allowing relocking of the CDRs throughout router 100 (i.e., relock bytes 1010) and, sometimes (if not always), the words used for frame detection (e.g., framing bytes such as A1/A2 bytes 1020). This is because relock bytes 1010 are not expected to always be synchronously locked due to the switching that may be performed during this portion of any given backplane frame, as previously discussed. Similarly, A1/A2 bytes 1020 may contain errors if framing is not established. Thus, the known expectation of such errors implies that such words should be ignored occasionally, if not always.

The inclusion/exclusion of certain of a frame's words is controlled by position detector 1170 via accumulate enable signal 1185. When asserted by position detector 1170, accumulate enable signal 1185 allows parity accumulation storage unit 1135 to accumulate (i.e., store) the current parity value generated by parity calculation unit 1130. This is the case when the given word is to be included in parity calculations (e.g., payload bytes 1080–1088). When de-asserted by position detector 1170, accumulate enable signal 1185 prevents the accumulation of parity information in parity accumulation storage unit 1135. This is the case when the given word is not to be included in parity calculations (e.g., relock bytes 1010). Moreover, such decisions can be made dynamically. For example, rather than always ignoring A1/A2 bytes 1020, frame synchronization signal 1115 can be used to determine if A1/A2 bytes 1020 should be included in the parity calculations (e.g., if frame synchronization signal 1115 indicates that frame synchronization exists, A1/A2 bytes 1020 are included in the parity calculations, while A1/A2 bytes 1020 are excluded if frame synchronization does not exist).

Once the requisite words have been included in the parity calculations, position detector 1170 asserts a save frame parity signal 1190, thus causing frame parity storage unit 1145 to store the output of parity accumulation storage unit 1135. Save frame parity signal 1190 can be generated using, for example, end-of-frame signal 1110, which (by indicating the end of a frame) indicates that the parity calculations for the given frame are at an end, and so the frame's parity value is now ready for insertion into a subsequent frame. Using input signals and designed-in knowledge of the frame, position detector 1170 can also determine when a previous frame's parity value should be inserted into the present frame. Upon making such a determination, position detector 1170 asserts an insert parity signal 1195 to cause frame assembly unit 1155 to insert the previous frame's parity value (presented by frame parity storage unit 1145 to frame assembly unit 1155 as frame parity signal 1150) into the current frame (provided to frame assembly unit 1155 by current frame signal 1105).

It will be apparent to one of skill in the art that techniques employing other signals, representing other parameters of the frame being analyzed, can be used with equal success in a backplane parity technique according to embodiments of the present invention. For example, a signal indicating the start of a frame could be used, from which indication position detector could identify the position of words in the given frame that are to be ignored. Moreover, as noted, the framing words of the given frame (e.g., A1/A2 bytes of a backplane frame) could always be ignored, obviating the need to determine framing synchronization (e.g., the inclusion of A1/A2 bytes 1020 in the parity calculation).

Figure 12:
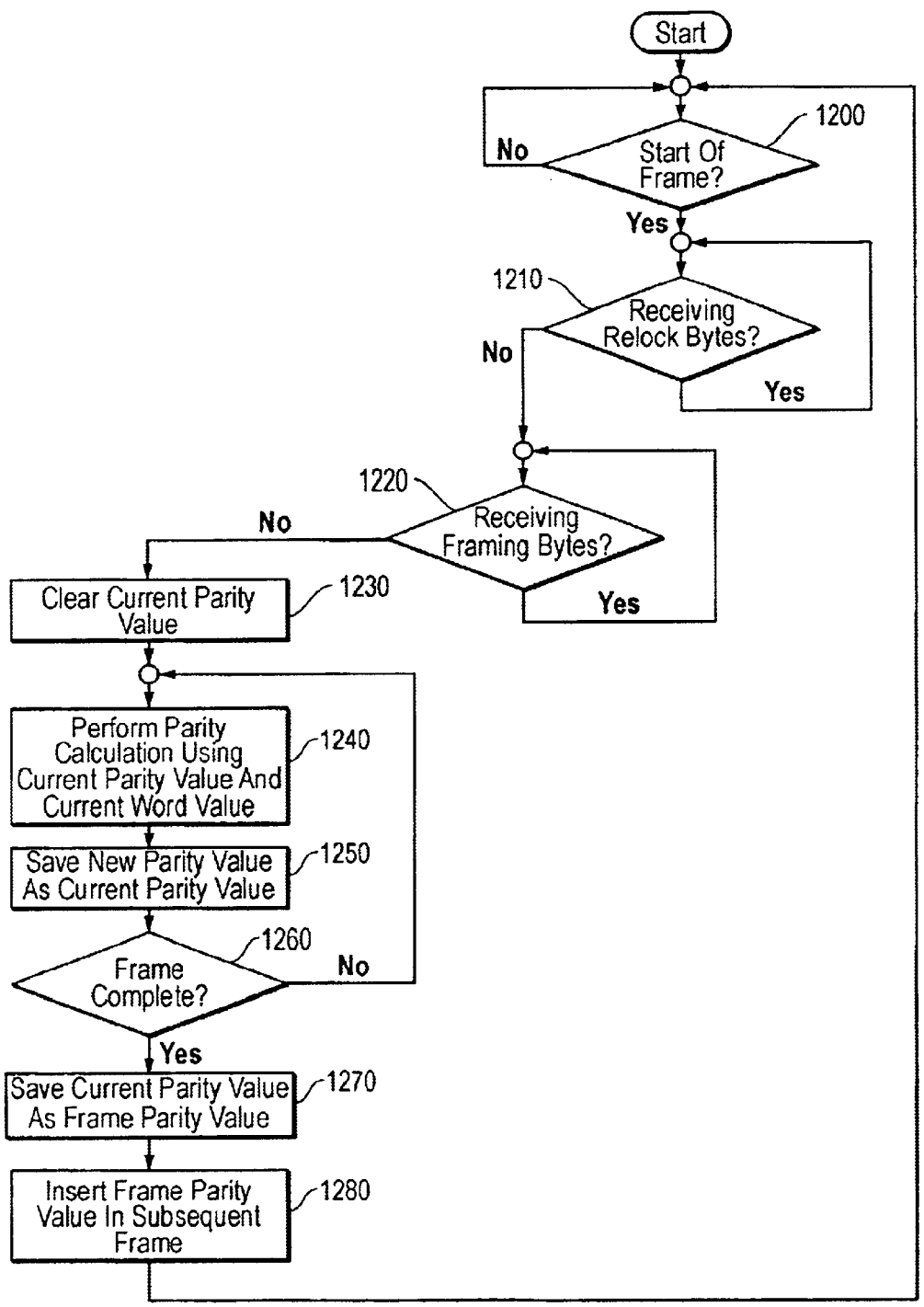
FIG. 12 is a flow diagram illustrating the operation of the parity generation circuit of FIG. 11.

FIG. 12 is a flow diagram illustrating the operation of the parity generation circuit of FIG. 11. The process begins with the start of a frame (or, alternatively, with the end of the previous frame) (step 1200). Once the beginning of a frame is detected, the position detector determines whether relock bytes (e.g., relock bytes 1010) are being received (step 1210). So long as such relock bytes are being received, they are ignored insofar as parity calculations are concerned (step 1210). It will be noted that this sequence assumes that a frame layout such as the backplane (in fact, ESF) frame layout depicted in FIG. 10 is used, and so the actions discussed herein are designed to deal with such a backplane frame. It will be apparent to one of skill in the art that a different frame layout could engender a different ordering of the actions discussed, or even a different set of actions altogether.

Next, a determination is made as to whether framing bytes (e.g., A1/A2 bytes 1020) are being received. So long as such framing bytes are being received, they are ignored insofar as parity calculations are concerned (step 1220). Once the words of the current frame that are not included in parity calculations have been received, the current parity value is cleared (step 1230). It should be noted that this action could be performed once the beginning of the frame is detected, as well as anywhere in between, so long as it is cleared before the first parity value is to be calculated. Alternatively, parity function unit 1125 could be designed to simply calculate the first parity value using a default value (e.g., all zeros) and ignore the parity value stored in parity accumulation storage unit 1135. Once parity accumulation storage unit 1135 is cleared, parity calculations are performed using the current word and the current parity value (step 1240). The result is then stored in parity accumulation storage unit 1135 (step 1250). This continues until the frame has been completely processed (step 1260). It should be noted that words within the frame (other than at the beginning of the frame) could also be excluded from the parity calculations by inserting the actions required to detect and exclude such words. Once the desired words of the given frame have been included in the parity calculations, the frame's parity value is stored in frame parity storage unit 1145 (step 1270). The frame's parity value is then inserted into a subsequent frame, for transmission across the backplane (step 1280).

Figure 13:
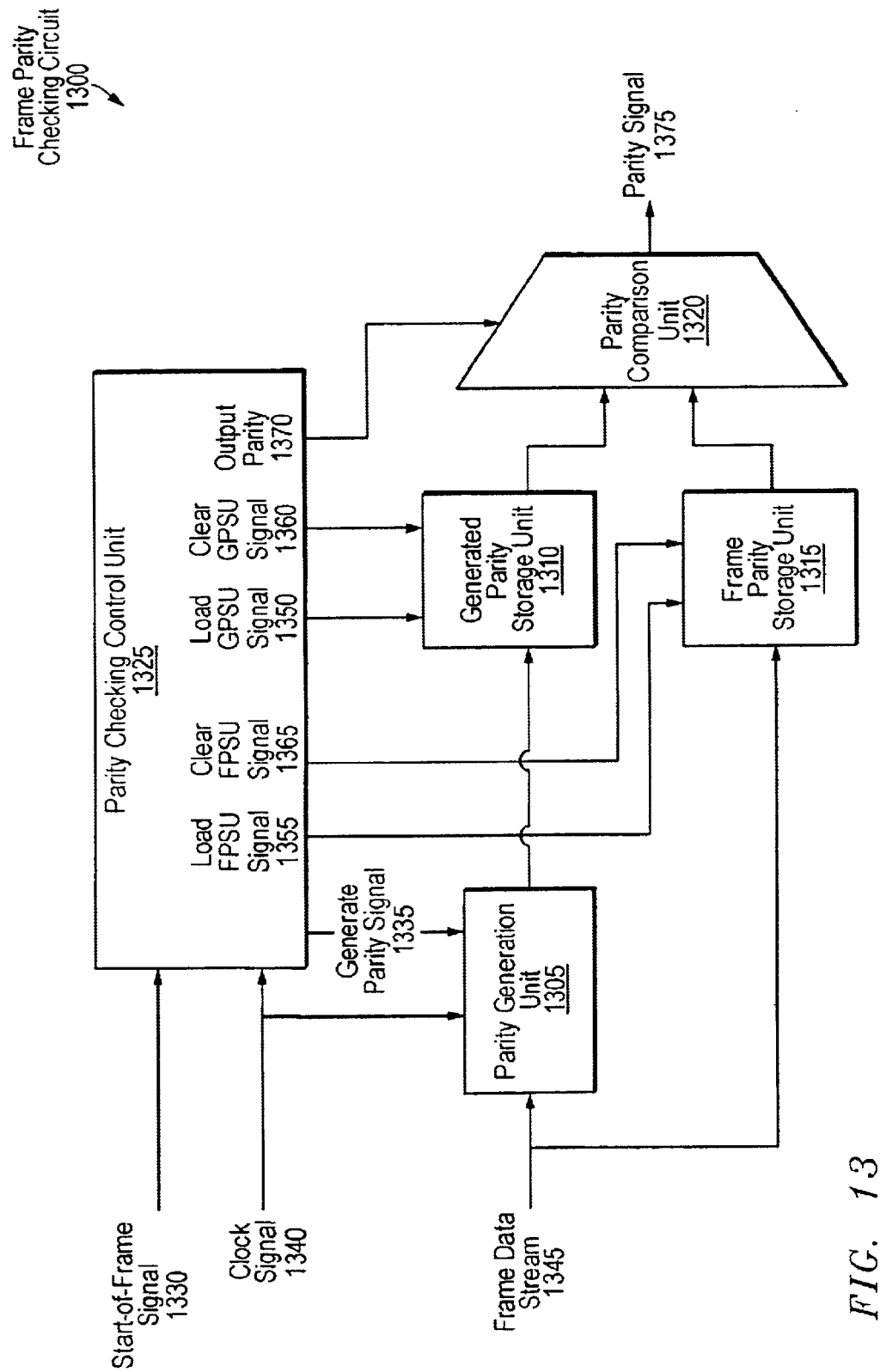
FIG. 13 is a block diagram illustrating a parity checking circuit according to an embodiment of the present invention.

FIG. 13 is a block diagram illustrating a frame parity checking circuit 1300 according to an embodiment of the present invention. Frame parity checking circuit 1300 includes a parity generation unit 1305, a generated parity storage unit (GPSU) 1310, a frame parity storage unit (FPSU) 1315 and a parity comparison unit 1320. Generated parity storage unit 1310, frame parity storage unit 1315 and parity comparison unit 1320 are controlled by a parity checking control unit 1325. Upon the assertion of start-of-frame signal 1330, parity checking control unit 1325 causes parity generation unit 1305 to generate parity over a given frame by asserting a generate parity signal 1335. It will be noted that the design of parity generation unit 1305 can follow generally that of frame parity generation circuit 1100. It will also be noted that a clock signal 1340 is provided to frame parity checking circuit 1300 and parity generation unit 1305 to allow those units to maintain synchronization with the incoming data stream (depicted in FIG. 13 by a frame data stream 1345).

Once parity generation unit 1305 generates a parity value for the given frame, this parity value is stored in generated parity storage unit 1310 by asserting a load GPSU signal 1350. Parity generation unit 1305 then proceeds to generate a parity value for a subsequent frame. The subsequent frame, per the descriptions of FIGS. 11 and 12, contains the parity value generated for the previous frame on the other side of the backplane and stored in the subsequent frame. During the processing of the subsequent frame, the parity value for the previous frame is read from the subsequent frame and stored in frame parity storage unit 1315 by asserting a load FPSU signal 1355. Thus, while a parity value is being generated for the subsequent frame, generated parity storage unit 1310 contains the parity value generated for the previous frame, and frame parity storage unit 1315 contains the parity value generated for the previous frame and stored in the subsequent frame. As might be expected, generated parity storage unit 1310 and frame parity storage unit 1315 can be cleared prior to storing their respective parity values by parity checking control unit 1325, for example, asserting a clear GPSU signal 1360 and a clear FPSU signal 1365, respectively.

The outputs of generated parity storage unit 1310 and frame parity storage unit 1315 are provided to parity comparison unit 1320, which compares the parity value generated for the previous frame and the parity value stored in the subsequent frame. When the result of the comparison is desired, parity checking control unit 1325 asserts an output parity signal 1370, which causes parity comparison unit 1320 to output a parity signal 1375. Parity signal 1375 indicates whether the parity value generated matches that generated by the parity generation circuitry on the other side of the backplane and stored in the subsequent frame. An error is indicated if the two parity values do not match.

Figure 14:
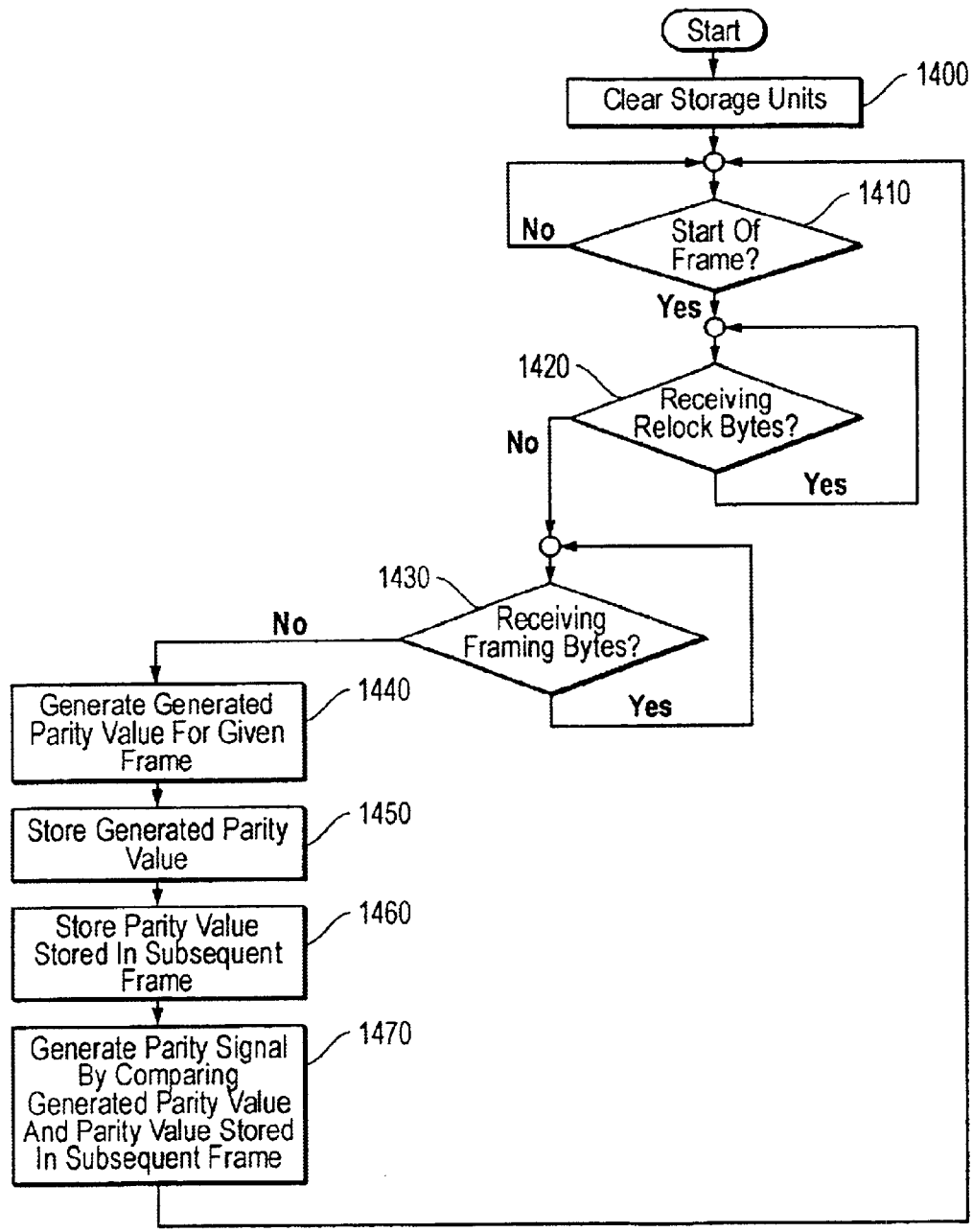
FIG. 14 is a flow diagram illustrating the operation of the parity checking circuit of FIG. 13.

FIG. 14 is a flow diagram illustrating the operation of parity checking circuit 1300 of FIG. 13. The process begins with the clearing of the storage units, generated parity storage unit 1310 and frame parity storage unit 1315 (step 1400). It will be noted that this clearing can be performed at any time prior to loading the storage unit's respective parity values (or, by simply loading those parity values, the action could be made unnecessary). Next, the start of a frame (or, alternatively, with the end of the previous frame) is detected (step 1410). Once the frame boundary (i.e., start-of-frame or end-of-frame) is detected, parity generation unit 1305 (and, optionally, parity checking control unit 1325, depending upon the control structure selected (i.e., whether parity generation unit 1305 is under its own control, or under the control of parity checking control unit 1325)) cycle through relock bytes 1010 (step 1420). Next, parity generation unit 1305 (and, optionally, parity checking control unit 1325, as before) cycle through framing bytes (e.g., A1/A2 bytes 1020) (step 1430). Both relock bytes 1010 and A1/A2 bytes 1020 are ignored in this implementation. A generated parity value for the given frame is then generated by parity generation unit 1305 (step 1440). The generated parity value thus generated is then stored in generated parity storage unit 1310 via the assertion of load GPSU signal 1350 by parity checking control unit 1325 (step 1450). While a generated parity value is being generated for a subsequent frame, the parity value stored in that subsequent frame is stored in frame parity storage unit 1315 via the assertion of load FPSU signal 1355 by parity checking control unit 1325 (step 1460). Parity signal 1375 is then output in response to the assertion of output parity signal 1370 by parity checking control unit 1325, which outputs the result of a comparison of the generated parity value and the parity value stored in the subsequent frame by the parity generation circuitry on the other side of the backplane.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims.

What is claimed is:

1. A method of communicating a data stream through a telecommunications system comprising:

receiving said data stream at a communications interface of said telecommunications system, wherein said data stream comprises a first plurality of words;

rearranging said data stream into a second plurality of words, wherein said second plurality of words include a relock word, and said relock word is configured to allow said telecommunications system to synchronize with said data stream;

for each of said second plurality of words,
determining if said each of said second plurality of words should be included in a backplane parity value calculation by determining if said each of said second plurality of words is said relock word; and
excluding said each of said second plurality of words from said backplane parity value calculation if said each of said second plurality of words is determined to be said relock word.

2. The method of claim 1, further comprising:
for said each of said second plurality of words,
including said each of said second plurality of words in said backplane parity value calculation if said each of said second plurality of words is determined to not be said relock word.

3. The method of claim 2, wherein said backplane parity value calculation comprises:
calculating a backplane parity value by performing a bit-wise exclusive-or between said each of said second plurality of words included in said backplane parity value calculation, wherein said each of said second plurality of words included in said backplane parity value calculation is a byte.

4. The method of claim 2, wherein said first plurality of words is organized as a first frame having a first frame format and said second plurality of words is organized as a second frame having a second frame format.

5. The method of claim 4, wherein said relock word is among a plurality of such relock words and said second frame includes said plurality of such relock words.

6. The method of claim 2, wherein
said telecommunications system includes a switching matrix coupled to said communications interface, and
said switching matrix switches during a period of time during which said relock word traverses said switching matrix.

7. A method of transmitting information through a switching matrix comprising:
receiving information, wherein
said information is in a transmission unit,
said transmission unit is divided into a plurality of words, and
said plurality of words are arranged in a first format;
rearranging said plurality of words into a second format wherein
said second format includes a relock word,
said relock word is configured to allow said switching matrix to synchronize with said transmission unit; and
generating a backplane parity value from at least one of said plurality of words, said generating comprising
for each of said plurality of words, determining if said each of said plurality of words should be used to generate said backplane parity value by determining if said each of said plurality of words is said relock word, and
excluding said each of said plurality of words from a calculation of said backplane parity value if said each of said plurality of words is determined to be said relock word.

8. The method of claim 7, wherein said information is received as an optical signal.

9. The method of claim 7, wherein said transmission unit is a frame.

10. The method of claim 9, wherein said frame is a SONET frame.

11. The method of claim 9, wherein said rearranging rearranges said transmission unit into a backplane frame.

12. The method of claim 7, wherein said backplane parity value is a backplane parity byte.

13. The method of claim 12, wherein
each one of said plurality of words is a byte, and
said generating comprises calculating said backplane parity value by performing a bit-wise exclusive-or between said plurality of words.

14. The method of claim 7, wherein said second format allows said switching matrix to be switched errorlessly.

15. The method of claim 7, wherein said switching matrix is switched during a period of time during which said relock word is traversing said switching matrix.

16. A computer program product encoded in computer readable media for communicating a data stream through a telecommunications system, said computer program product comprising:
a first set of instructions, executable on a computer system, configured to cause a communications interface of said telecommunications system to receive said data stream, wherein said data stream comprises a first plurality of words;
a second set of instructions, executable on said computer system, configured to rearrange said data stream into a second plurality of words, wherein
said second plurality of words include a relock word, and
said relock word is configured to allow said telecommunications system to synchronize with said data stream;
a third set of instructions, executable on said computer system, configured to, for each of said second plurality of words,
determine if said each of said second plurality of words should be included a backplane parity value calculation by determining if said each of said second plurality of words is said relock word, and
exclude said each of said second plurality of words from said backplane parity value calculation if said each of said second plurality of words is determined to be said relock word.

17. The computer program product of claim 16, said computer program product further comprising:
a fourth set of instructions, executable on said computer system, configured to, for said each of said second plurality of words,
include said each of said second plurality of words in said backplane parity value calculation if said each of said second plurality of words is determined to not be said relock word.

18. The computer program product of claim 17, wherein said backplane parity value calculation comprises:
calculating a backplane parity value by performing a bit-wise exclusive-or between said each of said second plurality of words included in said backplane parity value calculation, wherein said each of said second plurality of words included in said backplane parity value calculation is a byte.

19. The computer program product of claim 17, wherein said first plurality of words is organized as a first frame having a first frame format and said second plurality of words is organized as a second frame having a second frame format.

20. The computer program product of claim 19, wherein said relock word is among a plurality of such relock words and said second frame includes said plurality of such relock words.

21. The computer program product of claim 17, wherein
    said telecommunications system includes a switching matrix coupled to said communications interface, and
    said switching matrix switches during a period of time during which said relock word traverses said switching matrix.

22. A telecommunications system comprising:
    a processor;
    a communications interface, coupled to said processor;
    computer readable medium coupled to said processor; and
    computer code, encoded in said computer readable medium, configured to cause a data stream to be communicated through said telecommunications system by virtue of being configured to cause said processor to:
        receive said datastream at said communications interface, wherein said data stream comprises a first plurality of words;
        rearrange said data stream into a second plurality of words, wherein
            said second plurality of words include a relock word, and
            said relock word is configured to allow said telecommunications system to synchronize with said data stream;
        for each of said second plurality of words,
            determine if said each of said second plurality of words should be included in a backplane parity value calculation by determining if said each of said second plurality of words is said relock word; and
            exclude said each of said second plurality of words from said backplane parity value calculation if said each of said second plurality of words is determined to be said relock word.

23. The telecommunications system of claim 22, wherein said computer code is further configured to cause said processor to:
    for said each of said second plurality of words,
        include said each of said second plurality of words in said backplane parity value calculation if said each of said second plurality of words is determined to not be said relock word.

24. The telecommunications system of claim 23, wherein said backplane parity value calculation comprises:
    calculating a backplane parity value by performing a bit-wise exclusive-or between said each of said second plurality of words included in said backplane parity value calculation, wherein said each of said second plurality of words included in said backplane parity value calculation is a byte.

25. The telecommunications system of claim 23, wherein said first plurality of words is organized as a first frame having a first frame format and said second plurality of words is organized as a second frame having a second frame format.

26. The telecommunications system of claim 25, wherein said relock word is among a plurality of such relock words and said second frame includes said plurality of such relock words.

27. The telecommunications system of claim 23, further comprising:
    a switching matrix coupled to said communications interface, wherein
        said switching matrix is configured to switch during a period of time during which said relock word traverses said switching matrix.

28. A telecommunications system comprising:
    means for receiving a datastream, wherein said data stream comprises a first plurality of words;
    means for rearranging said data stream into a second plurality of words, wherein
        said second plurality of words include a relock word, and
        said relock word is configured to allow said telecommunications system to synchronize with said data stream;
    means, for each of said second plurality of words,
        for determining if said each of said second plurality of words should be included in a backplane parity value calculation by determining if said each of said second plurality of words is said relock word; and
        for excluding, for each of said second plurality of words, said each of said second plurality of words from said backplane parity value calculation if said each of said second plurality of words is determined to be said relock word.

29. The telecommunications system of claim 28, further comprising:
    means, for said each of said second plurality of words,
        for including said each of said second plurality of words in said backplane parity value calculation if said each of said second plurality of words is determined to not be said relock word.

30. The telecommunications system of claim 29, wherein said backplane parity value calculation comprises:
    calculating a backplane parity value by performing a bit-wise exclusive-or between said each of said second plurality of words included in said backplane parity value calculation, wherein said each of said second plurality of words included in said backplane parity value calculation is a byte.

31. The telecommunications system of claim 29, wherein said first plurality of words is organized as a first frame having a first frame format and said second plurality of words is organized as a second frame having a second frame format.

32. The telecommunications system of claim 31, wherein said relock word is among a plurality of such relock words and said second frame includes said plurality of such relock words.

33. The telecommunications system of claim 29, further comprising:
    switching means for switching said data stream, wherein
        said switching means is coupled to said means for receiving, and
        said switching means is configured to switch during a period of time during which said relock word traverses said switching means.

34. A telecommunications system comprising:
    a switching matrix;
    a communications interface, wherein
        said communications interface is coupled to said switching matrix,
        said communications interface is configured to receive a data stream comprising a plurality of words,
        said plurality of words include at least one word that is designated as a relock word, said switching matrix is configured to be switched without causing disruption of another data stream being communicated through said switching matrix by switching during a period of time during which said at least one word traverses said switching matrix; and a parity generation circuit, coupled to said communications interface and configured, for each of said plurality of words, to determine if said each of said plurality of words should be used to generate a backplane parity value by determining if said each of said plurality of words is said at least one word, and exclude said each of said plurality of words from a calculation of said backplane parity value if said each of said plurality of words is determined to be said at least one word.

35. The telecommunications system of claim 34, wherein said parity generation circuit comprises:

a parity function unit configured to generate said backplane parity value; and a position detector, coupled to said parity function unit and configured to cause said parity function unit to include one of said words in said calculation of said backplane parity value if said one of said words is determined to not be said at least one word.

36. The telecommunications system of claim 34, wherein said communications interface is further configured to:

insert said backplane parity value into said data stream; and communicate said data stream through said switching matrix.

37. The telecommunications system of claim 34, wherein said communications interface further comprises:

a frame assembly unit, coupled to an input and an output of said communications interface.

38. The telecommunications system of claim 37, wherein said frame assembly unit is configured to allow insertion of said backplane parity value into said data stream, and said communications interface is configured to communicate said data stream through said switching matrix.

39. The telecommunications system of claim 37, further comprising:

a parity checking circuit, wherein
said communications interface comprises a receive section coupled to an input of said switching matrix and a transmit section coupled to an output of said switching matrix,
said receive section comprises said parity generation circuit, and
said transmit section comprises said parity checking circuit.

40. The telecommunications system of claim 39, wherein said parity checking circuit comprises:

a parity generation unit;
a storage unit;
a comparison unit, coupled to said parity generation unit and said storage unit; and
a parity checking control unit, coupled to said parity generation unit, said storage unit and said comparison unit.

41. The telecommunications system of claim 40, wherein said parity checking control unit is configured to cause said parity generation unit to generate a parity value and to cause said storage unit to store said backplane parity value, and said comparison unit is configured to compare said parity value and said backplane parity value and to indicate an error if said parity value and said backplane parity value do not match.

42. A method of generating a backplane parity value comprising:

for each of a plurality of words in a data stream,
determining if said each of said plurality of words should be used to generate said backplane parity value by determining if said each of said plurality of words is a relock word, and
excluding said each of said plurality of words from a calculation of said backplane parity value if said each of said plurality of words is determined to be said relock word, wherein
at least one of said plurality of words is designated as said relock word,
said data stream is to be communicated through a switching matrix of a telecommunications system, and
said at least one of said plurality of words allows said switching matrix to be switched without causing disruption of another data stream being communicated through said switching matrix.

43. The method of claim 42, wherein said relock word is among a plurality of such relock words and said plurality of words includes said plurality of relock words.

44. The method of claim 43, further comprising:

generating said backplane parity value using those of said plurality of words that are determined to be not among said plurality of relock words.

45. The method of claim 43, further comprising:

inserting said backplane parity value into said data stream; and communicating said data stream through said switching matrix.

46. The method of claim 45, further comprising:

switching said switching matrix during a period of time during which said plurality of relock words traverse said switching matrix.

47. The method of claim 45, further comprising:

receiving said data stream from said switching matrix;
generating a parity value from said data stream;
comparing said parity value to said backplane parity value; and
generating an error signal if said comparison indicates that said parity value and said backplane parity value do not match.

48. The method of claim 42, wherein said plurality of relock words are configured to allow said telecommunications system to synchronize with said data stream.

49. The method of claim 42, further comprising:

rearranging said data stream into a second plurality of words, wherein
a plurality of said second plurality of words are designated as relock words, and
said relock word is among said plurality of relock words.

50. The method of claim 49, wherein said plurality of relock words are configured to allow said telecommunications system to synchronize with said data stream.

51. The method of claim 49, wherein said plurality of words are organized as a first frame having a first frame format,
said second plurality of words are organized as a second frame having a second frame format, said first frame format is that of a SONET frame, and said second frame format is that of an Errorless Switching frame.

52. A computer program product for generating a backplane parity value, said computer program product encoded in computer readable media, said computer program product comprising:

a first set of instructions, executable on a computer system, configured, for each of a plurality of words in a data stream, to determine if said each of said plurality of words should be used to generate said backplane parity value by determining if said each of said plurality of words is a relock word, and exclude said each of said plurality of words from a calculation of said backplane parity value if said each of said plurality of words is determined to be said relock word, wherein at least one of said plurality of words is designated as said relock word, said data stream is to be communicated through a switching matrix of a telecommunications system, and said at least one of said plurality of words allows said switching matrix to be switched without causing disruption of another data stream being communicated through said switching matrix.

53. The computer program product of claim 52, wherein said relock word is among a plurality of such relock words and said plurality of words includes said plurality of relock words.

54. The computer program product of claim 53, further comprising:

a second set of instructions, executable on said computer system, configured to generate said backplane parity value using those of said plurality of words that are determined to be not among said plurality of relock words.

55. The computer program product of claim 53, further comprising:

a second set of instructions, executable on said computer system, configured to insert said backplane parity value into said data stream; and a third set of instructions, executable on said computer system, configured to communicate said data stream through said switching matrix.

56. The computer program product of claim 55, further comprising:

a fourth set of instructions, executable on said computer system, configured to switch said switching matrix during a period of time during which said plurality of relock words traverse said switching matrix.

57. The computer program product of claim 55, further comprising:

a fourth set of instructions, executable on said computer system, configured to receive said data stream from said switching matrix;

a fifth set of instructions, executable on said computer system, configured to generate a parity value from said data stream;

a sixth set of instructions, executable on said computer system, configured to compare said parity value to said backplane parity value; and a seventh set of instructions, executable on said computer system, configured to generate an error signal if said comparison indicates that said parity value and said backplane parity value do not match.

58. The computer program product of claim 52, wherein said plurality of relock words are configured to allow said telecommunications system to synchronize with said data stream.

59. The computer program product of claim 52, further comprising:

a fourth set of instructions, executable on said computer system, configured to rearrange said data stream into a second plurality of words, wherein a plurality of said second plurality of words are designated as relock words, and said relock word is among said plurality of relock words.

60. The computer program product of claim 59, wherein said plurality of relock words are configured to allow said telecommunications system to synchronize with said data stream.

61. The computer program product of claim 59, wherein said plurality of words are organized as a first frame having a first frame format, said second plurality of words is are organized as a second frame having a second frame format, said first frame format is that of a SONET frame, and said second frame format is that of an Errorless Switching frame.

62. A telecommunications system comprising:

a processor;

a communications interface, coupled to said processor;

computer readable medium coupled to said processor; and computer code, encoded in said computer readable medium, configured to generate a backplane parity value by virtue of being configured to cause said processor to:

for each of a plurality of words in a data stream, determine if said each of said plurality of words should be used to generate said backplane parity value by determining if said each of said plurality of words is a relock word, and exclude said each of said plurality of words from a calculation of said backplane parity value if said each of said plurality of words is determined to be said relock word, wherein at least one of said plurality of words is designated as said relock word, said data stream is to be communicated through a switching matrix of a telecommunications system, and said at least one of said plurality of words allows said switching matrix to be switched without causing disruption of another data stream being communicated through said switching matrix.

63. The telecommunications system of claim 62, wherein said relock word is among a plurality of such relock words and said plurality of words includes said plurality of relock words.

64. The telecommunications system of claim 63, said computer code further configured to cause said processor to:

generate said backplane parity value using those of said plurality of words that are determined to be not among said plurality of relock words.

65. The telecommunications system of claim 63, said computer code further configured to cause said processor to:

insert said backplane parity value into said data stream; and communicate said data stream through said switching matrix.

66. The telecommunications system of claim 65, said computer code further configured to cause said processor to:

switch said switching matrix during a period of time during which said plurality of relock words traverse said switching matrix.

67. The telecommunications system of claim 65, said computer code further configured to cause said processor to:

receive said data stream from said switching matrix;

generate a parity value from said data stream;

compare said parity value to said backplane parity value; and generate an error signal if said comparison indicates that said parity value and said backplane parity value do not match.

68. The telecommunications system of claim 62, wherein said plurality of relock words are configured to allow said telecommunications system to synchronize with said data stream.

69. The telecommunications system of claim 62, said computer code further configured to cause said processor to:

rearrange said data stream into a second plurality of words, wherein
- a plurality of said second plurality of words are designated as relock words, and
- said relock word is among said plurality of relock words.

70. The telecommunications system of claim 69, wherein said plurality of relock words are configured to allow said telecommunications system to synchronize with said data stream.

71. The telecommunications system of claim 69, wherein said plurality of words are organized as a first frame having a first frame format, said second plurality of words are organized as a second frame having a second frame format, said first frame format is that of a SONET frame, and said second frame format is that of an Errorless Switching frame.

72. An apparatus for generating a backplane parity value comprising:

means, for each of a plurality of words in a data stream,
for determining if said each of said plurality of words should be used to generate said backplane parity value by determining if said each of said plurality of words is a relock word, and
for excluding said each of said plurality of words from a calculation of said backplane parity value if said each of said plurality of words is determined to be said relock word, wherein
at least one of said plurality of words is designated as said relock word,
said data stream is to be communicated through a switching matrix of a telecommunications system, and
said at least one of said plurality of words allows said switching matrix to be switched without causing disruption of another data stream being communicated through said switching matrix.

73. The apparatus of claim 72, wherein said relock word is among a plurality of such relock words and said plurality of words includes said plurality of relock words.

74. The apparatus of claim 73, further comprising:

means for generating said backplane parity value using those of said plurality of words that are determined to be not among said plurality of relock words.

75. The apparatus of claim 73, further comprising:

means for inserting said backplane parity value into said data stream; and means for communicating said data stream through said switching matrix.

76. The apparatus of claim 75, further comprising:

means for switching said switching matrix during a period of time during which said plurality of relock words traverse said switching matrix.

77. The apparatus of claim 75, further comprising:

means for receiving said data stream from said switching matrix;

means for generating a parity value from said data stream;

means for comparing said parity value to said backplane parity value; and means for generating an error signal if said comparison indicates that said parity value and said backplane parity value do not match.

78. The apparatus of claim 72, wherein said plurality of relock words are configured to allow said telecommunications system to synchronize with said data stream.

79. The apparatus of claim 72, further comprising:

means for rearranging said data stream into a second plurality of words, wherein
- a plurality of said second plurality of words are designated as relock words, and
- said relock word is among said plurality of relock words.

80. The apparatus of claim 79, wherein said plurality of relock words are configured to allow said telecommunications system to synchronize with said data stream.

81. The apparatus of claim 79, wherein said plurality of words are organized as a first frame having a first frame format, said second plurality of words are organized as a second frame having a second frame format, said first frame format is that of a SONET frame, and said second frame format is that of an Errorless Switching frame.

* * * * *